US012480158B1

(12) United States Patent
Salmanzadeh et al.

(10) Patent No.: US 12,480,158 B1
(45) Date of Patent: Nov. 25, 2025

(54) METHODS AND SYSTEMS FOR PROCESSING POLYNUCLEOTIDES

(71) Applicant: 10X GENOMICS, INC., Pleasanton, CA (US)

(72) Inventors: Alireza Salmanzadeh, San Ramon, CA (US); Dagmar Walter, San Francisco, CA (US)

(73) Assignee: 10X GENOMICS, INC., Pleasanton, CA (US)

( * ) Notice: Subject to any disclaimer, the term of this patent is extended or adjusted under 35 U.S.C. 154(b) by 0 days.

(21) Appl. No.: 18/297,449

(22) Filed: Apr. 7, 2023

Related U.S. Application Data

(63) Continuation of application No. 17/517,408, filed on Nov. 2, 2021, now abandoned.

(60) Provisional application No. 63/109,972, filed on Nov. 5, 2020.

(51) Int. Cl.
*C12Q 1/6806* (2018.01)
*C12Q 1/6813* (2018.01)
*C12Q 1/6876* (2018.01)

(52) U.S. Cl.
CPC ......... *C12Q 1/6876* (2013.01); *C12Q 1/6806* (2013.01); *C12Q 1/6813* (2013.01); *C12Q 2563/149* (2013.01); *C12Q 2563/159* (2013.01); *C12Q 2565/626* (2013.01)

(58) Field of Classification Search
CPC ............... C12Q 1/6876; C12Q 1/6806; C12Q 2545/114; C12Q 2563/107; C12Q 2563/149; C12Q 2565/50; C12Q 2565/626
See application file for complete search history.

(56) References Cited

U.S. PATENT DOCUMENTS

| | | | |
|---|---|---|---|
| 4,124,638 A | 11/1978 | Hansen | |
| 5,185,099 A | 2/1993 | Delpuech et al. | |
| 5,270,183 A | 12/1993 | Corbett et al. | |
| 5,478,893 A | 12/1995 | Ghosh et al. | |
| 5,736,330 A | 4/1998 | Fulton | |
| 5,756,334 A | 5/1998 | Perler et al. | |
| 5,846,719 A | 12/1998 | Brenner et al. | |
| 5,900,481 A | 5/1999 | Lough et al. | |
| 5,942,609 A | 8/1999 | Hunkapiller et al. | |
| 5,994,056 A | 11/1999 | Higuchi | |
| 6,033,880 A | 3/2000 | Haff et al. | |
| 6,057,149 A | 5/2000 | Burns et al. | |
| 6,123,798 A | 9/2000 | Gandhi et al. | |
| 6,171,850 B1 | 1/2001 | Nagle et al. | |
| 6,172,218 B1 | 1/2001 | Brenner | |
| 6,176,962 B1 | 1/2001 | Soane et al. | |
| 6,306,590 B1 | 10/2001 | Mehta et al. | |
| 6,327,410 B1 | 12/2001 | Walt et al. | |
| 6,379,929 B1 | 4/2002 | Burns et al. | |
| 6,406,848 B1 | 6/2002 | Bridgham et al. |
| 6,409,832 B2 | 6/2002 | Weigl et al. |
| 6,492,118 B1 | 12/2002 | Abrams et al. |
| 6,524,456 B1 | 2/2003 | Ramsey et al. |
| 6,586,176 B1 | 7/2003 | Trnovsky et al. |
| 6,632,655 B1 | 10/2003 | Mehta et al. |
| 6,915,679 B2 | 7/2005 | Chien et al. |
| 7,041,481 B2 | 5/2006 | Anderson et al. |
| 7,115,400 B1 | 10/2006 | Adessi et al. |
| 7,129,091 B2 | 10/2006 | Ismagilov et al. |
| 7,268,167 B2 | 9/2007 | Higuchi et al. |
| 7,282,370 B2 | 10/2007 | Bridgham et al. |
| 7,294,503 B2 | 11/2007 | Quake et al. |
| 7,323,305 B2 | 1/2008 | Leamon et al. |
| 7,544,473 B2 | 6/2009 | Brenner |
| 7,622,076 B2 | 11/2009 | Davies et al. |
| 7,622,280 B2 | 11/2009 | Holliger et al. |
| 7,645,596 B2 | 1/2010 | Williams et al. |
| 7,708,949 B2 | 5/2010 | Stone et al. |
| 7,772,287 B2 | 8/2010 | Higuchi et al. |
| 7,776,927 B2 | 8/2010 | Chu et al. |
| 7,842,457 B2 | 11/2010 | Berka et al. |
| 7,910,354 B2 | 3/2011 | Drmanac et al. |
| 7,927,797 B2 | 4/2011 | Nobile et al. |
| 7,960,104 B2 | 6/2011 | Drmanac et al. |
| 7,968,287 B2 | 6/2011 | Griffiths et al. |
| 8,053,192 B2 | 11/2011 | Bignell et al. |
| 8,133,719 B2 | 3/2012 | Drmanac et al. |
| 8,168,385 B2 | 5/2012 | Brenner |
| 8,268,564 B2 | 9/2012 | Roth et al. |
| 8,273,573 B2 | 9/2012 | Ismagilov et al. |
| 8,298,767 B2 | 10/2012 | Brenner et al. |
| 8,304,193 B2 | 11/2012 | Ismagilov et al. |
| 8,318,433 B2 | 11/2012 | Brenner |

(Continued)

FOREIGN PATENT DOCUMENTS

| | | | |
|---|---|---|---|
| EP | 1019496 B1 | 9/2004 | |
| EP | 1841879 A2 | 10/2007 | |

(Continued)

OTHER PUBLICATIONS

Bottcher et al. Annals of the New York Academy of Sciences 2006; 1075: 50-56 (Year: 2006).*
Driedonks et al. Technical approaches to reduce interference of Fetal calf serum derived RNA in the analysis of extracellular vesicle RNA from cultured cells. Journal of Extracellular Vesicles 2018; 8: 1552059 (Year: 2018).*
Zhou et al. Circulating RNA as a novel tumor marker: An in vitro study of the origins and characteristics of extracellular RNA. Cancer Letters 2008; 259: 50-60 (Year: 2008).*
Pensold, D. and Zimmer-Bensch, G. Methods for Single-Cell Isolation and Preparation. Advances in Experimental Medicine and Biology 2020; 1255: 7-27 (Year: 2020).*

(Continued)

*Primary Examiner* — Angela M. Bertagna
(74) *Attorney, Agent, or Firm* — WILSON SONSINI GOODRICH & ROSATI

(57) ABSTRACT

The present disclosure provides compositions, methods, systems, and devices for polynucleotide processing. Such polynucleotide processing may be useful for a variety of applications, including polynucleotide sequencing.

23 Claims, 9 Drawing Sheets

(56) References Cited

U.S. PATENT DOCUMENTS

| | | |
|---|---|---|
| 8,329,407 B2 | 12/2012 | Ismagilov et al. |
| 8,592,150 B2 | 11/2013 | Drmanac et al. |
| 8,658,430 B2 | 2/2014 | Miller et al. |
| 8,822,148 B2 | 9/2014 | Ismagilov et al. |
| 8,835,358 B2 | 9/2014 | Fodor et al. |
| 8,871,444 B2 | 10/2014 | Griffiths et al. |
| 8,889,083 B2 | 11/2014 | Ismagilov et al. |
| 8,975,302 B2 | 3/2015 | Light et al. |
| 9,012,390 B2 | 4/2015 | Holtze et al. |
| 9,029,083 B2 | 5/2015 | Griffiths et al. |
| 9,029,085 B2 | 5/2015 | Agresti et al. |
| 9,085,798 B2 | 7/2015 | Chee |
| 9,089,844 B2 | 7/2015 | Hiddessen et al. |
| 9,126,160 B2 | 9/2015 | Ness et al. |
| 9,156,010 B2 | 10/2015 | Colston et al. |
| 9,194,861 B2 | 11/2015 | Hindson et al. |
| 9,216,392 B2 | 12/2015 | Hindson et al. |
| 9,238,206 B2 | 1/2016 | Rotem et al. |
| 9,266,104 B2 | 2/2016 | Link |
| 9,290,808 B2 | 3/2016 | Fodor et al. |
| 9,328,382 B2 | 5/2016 | Drmanac et al. |
| 9,347,059 B2 | 5/2016 | Saxonov |
| 9,371,598 B2 | 6/2016 | Chee |
| 9,388,465 B2 | 7/2016 | Hindson et al. |
| 9,417,190 B2 | 8/2016 | Hindson et al. |
| 9,486,757 B2 | 11/2016 | Romanowsky et al. |
| 9,498,761 B2 | 11/2016 | Holtze et al. |
| 9,500,664 B2 | 11/2016 | Ness et al. |
| 9,567,631 B2 | 2/2017 | Hindson et al. |
| 9,593,365 B2 | 3/2017 | Frisen et al. |
| 9,623,384 B2 | 4/2017 | Hindson et al. |
| 9,637,799 B2 | 5/2017 | Fan et al. |
| 9,644,204 B2 | 5/2017 | Hindson et al. |
| 9,689,024 B2 | 6/2017 | Hindson et al. |
| 9,694,361 B2 | 7/2017 | Bharadwaj et al. |
| 9,701,998 B2 | 7/2017 | Hindson et al. |
| 9,764,322 B2 | 9/2017 | Hiddessen et al. |
| 9,824,068 B2 | 11/2017 | Wong |
| 9,868,979 B2 | 1/2018 | Chee et al. |
| 9,879,313 B2 | 1/2018 | Chee et al. |
| 9,946,577 B1 | 4/2018 | Stafford et al. |
| 9,951,386 B2 | 4/2018 | Hindson et al. |
| 9,957,558 B2 | 5/2018 | Leamon et al. |
| 9,975,122 B2 | 5/2018 | Masquelier et al. |
| 10,011,872 B1 | 7/2018 | Belgrader et al. |
| 10,017,759 B2 | 7/2018 | Kaper et al. |
| 10,030,261 B2 | 7/2018 | Frisen et al. |
| 10,053,723 B2 | 8/2018 | Hindson et al. |
| 10,059,989 B2 | 8/2018 | Giresi et al. |
| 10,071,377 B2 | 9/2018 | Bharadwaj et al. |
| 10,221,436 B2 | 3/2019 | Hardenbol et al. |
| 10,221,442 B2 | 3/2019 | Hindson et al. |
| 10,253,364 B2 | 4/2019 | Hindson et al. |
| 10,273,541 B2 | 4/2019 | Hindson et al. |
| 10,323,279 B2 | 6/2019 | Hindson et al. |
| 10,347,365 B2 | 7/2019 | Wong et al. |
| 10,357,771 B2 | 7/2019 | Bharadwaj et al. |
| 10,395,758 B2 | 8/2019 | Schnall-Levin |
| 10,400,280 B2 | 9/2019 | Hindson et al. |
| 10,428,326 B2 | 10/2019 | Belhocine et al. |
| 10,533,221 B2 | 1/2020 | Hindson et al. |
| 10,544,413 B2 | 1/2020 | Bharadwaj et al. |
| 10,549,279 B2 | 2/2020 | Bharadwaj et al. |
| 10,557,158 B2 | 2/2020 | Hardenbol et al. |
| 10,590,244 B2 | 3/2020 | Delaney et al. |
| 10,745,742 B2 | 8/2020 | Bent et al. |
| 10,752,949 B2 | 8/2020 | Hindson et al. |
| 10,774,374 B2 | 9/2020 | Frisen et al. |
| 10,815,525 B2 | 10/2020 | Lucero et al. |
| 10,829,815 B2 | 11/2020 | Bharadwaj et al. |
| 10,837,047 B2 | 11/2020 | Delaney et al. |
| 10,874,997 B2 | 12/2020 | Weitz et al. |
| 10,995,333 B2 | 5/2021 | Pfeiffer |
| 11,371,094 B2 | 6/2022 | Ryvkin et al. |
| 11,459,607 B1 | 10/2022 | Terry et al. |
| 11,467,153 B2 | 10/2022 | Belhocine et al. |
| 11,655,499 B1 | 5/2023 | Pfeiffer |
| 11,845,983 B1 | 12/2023 | Belhocine et al. |
| 11,851,683 B1 | 12/2023 | Maheshwari et al. |
| 11,851,700 B1 | 12/2023 | Bava et al. |
| 11,920,183 B2 | 3/2024 | Bharadwaj et al. |
| 11,952,626 B2 | 4/2024 | Pfeiffer et al. |
| 12,084,715 B1 | 9/2024 | Lund |
| 12,163,179 B2 | 12/2024 | Bell et al. |
| 12,169,198 B2 | 12/2024 | Price et al. |
| 12,188,014 B1 | 1/2025 | Price et al. |
| 2002/0005354 A1 | 1/2002 | Spence et al. |
| 2002/0051971 A1 | 5/2002 | Stuelpnagel et al. |
| 2002/0092767 A1 | 7/2002 | Bjornson et al. |
| 2002/0119455 A1 | 8/2002 | Chan |
| 2002/0127736 A1 | 9/2002 | Chou et al. |
| 2003/0036206 A1 | 2/2003 | Chien et al. |
| 2003/0075446 A1 | 4/2003 | Culbertson et al. |
| 2003/0124509 A1 | 7/2003 | Kenis et al. |
| 2003/0215862 A1 | 11/2003 | Parce et al. |
| 2005/0130188 A1 | 6/2005 | Walt et al. |
| 2005/0250147 A1 | 11/2005 | Macevicz |
| 2005/0266582 A1 | 12/2005 | Modlin et al. |
| 2005/0287572 A1 | 12/2005 | Mathies et al. |
| 2006/0177832 A1 | 8/2006 | Brenner |
| 2006/0275782 A1 | 12/2006 | Gunderson et al. |
| 2007/0020640 A1 | 1/2007 | McCloskey et al. |
| 2007/0042419 A1 | 2/2007 | Barany et al. |
| 2007/0172873 A1 | 7/2007 | Brenner et al. |
| 2007/0190543 A1 | 8/2007 | Livak |
| 2007/0196397 A1 | 8/2007 | Torii et al. |
| 2007/0264320 A1 | 11/2007 | Lee et al. |
| 2008/0056948 A1 | 3/2008 | Dale et al. |
| 2008/0166720 A1 | 7/2008 | Hsieh et al. |
| 2008/0242560 A1 | 10/2008 | Gunderson et al. |
| 2009/0011943 A1 | 1/2009 | Drmanac et al. |
| 2009/0047713 A1 | 2/2009 | Handique |
| 2009/0099041 A1 | 4/2009 | Church et al. |
| 2009/0131543 A1 | 5/2009 | Weitz et al. |
| 2009/0148961 A1 | 6/2009 | Luchini et al. |
| 2009/0155563 A1 | 6/2009 | Petsev et al. |
| 2009/0202984 A1 | 8/2009 | Cantor |
| 2009/0235990 A1 | 9/2009 | Beer |
| 2009/0269248 A1 | 10/2009 | Falb et al. |
| 2009/0286687 A1 | 11/2009 | Dressman et al. |
| 2010/0035254 A1 | 2/2010 | Williams |
| 2010/0069263 A1 | 3/2010 | Shendure et al. |
| 2010/0086914 A1 | 4/2010 | Bentley et al. |
| 2010/0105866 A1 | 4/2010 | Fraden et al. |
| 2010/0184928 A1 | 7/2010 | Kumacheva |
| 2010/0216153 A1 | 8/2010 | Lapidus et al. |
| 2010/0248991 A1 | 9/2010 | Roesler et al. |
| 2010/0304982 A1 | 12/2010 | Hinz et al. |
| 2011/0217736 A1 | 9/2011 | Hindson |
| 2011/0305761 A1 | 12/2011 | Shum et al. |
| 2012/0071331 A1 | 3/2012 | Casbon et al. |
| 2012/0172259 A1 | 7/2012 | Rigatti et al. |
| 2012/0196288 A1 | 8/2012 | Beer |
| 2012/0219947 A1 | 8/2012 | Yurkovetsky et al. |
| 2012/0282605 A1* | 11/2012 | Dore .................. C12Q 1/689 |
| | | 435/6.12 |
| 2013/0028812 A1 | 1/2013 | Prieto et al. |
| 2013/0109575 A1 | 5/2013 | Kleinschmidt et al. |
| 2014/0065234 A1 | 3/2014 | Shum et al. |
| 2014/0221239 A1 | 8/2014 | Carman et al. |
| 2014/0272996 A1 | 9/2014 | Bemis |
| 2014/0274740 A1 | 9/2014 | Srinivasan et al. |
| 2014/0302503 A1 | 10/2014 | Lowe et al. |
| 2014/0338753 A1 | 11/2014 | Sperling et al. |
| 2015/0267191 A1 | 9/2015 | Steelman et al. |
| 2015/0361418 A1 | 12/2015 | Reed |
| 2015/0376605 A1 | 12/2015 | Jarosz et al. |
| 2015/0376609 A1 | 12/2015 | Hindson et al. |
| 2015/0376700 A1 | 12/2015 | Schnall-Levin et al. |
| 2015/0379196 A1 | 12/2015 | Schnall-Levin et al. |
| 2016/0008778 A1 | 1/2016 | Weitz et al. |
| 2016/0024558 A1 | 1/2016 | Hardenbol et al. |
| 2016/0024572 A1 | 1/2016 | Shishkin et al. |
| 2016/0053253 A1 | 2/2016 | Salathia et al. |

(56) References Cited

U.S. PATENT DOCUMENTS

| | | |
|---|---|---|
| 2016/0059204 A1 | 3/2016 | Hindson et al. |
| 2016/0060621 A1 | 3/2016 | Agresti et al. |
| 2016/0122753 A1 | 5/2016 | Mikkelsen et al. |
| 2016/0122817 A1 | 5/2016 | Jarosz et al. |
| 2016/0203196 A1 | 7/2016 | Schnall-Levin et al. |
| 2016/0232291 A1 | 8/2016 | Kyriazopoulou-Panagiotopoulou et al. |
| 2016/0244809 A1 | 8/2016 | Belgrader et al. |
| 2016/0281160 A1 | 9/2016 | Jarosz et al. |
| 2016/0289769 A1 | 10/2016 | Schwartz et al. |
| 2016/0314242 A1 | 10/2016 | Schnall-Levin et al. |
| 2016/0348093 A1 | 12/2016 | Price et al. |
| 2017/0016041 A1 | 1/2017 | Greenfield et al. |
| 2017/0128937 A1 | 5/2017 | Hung et al. |
| 2017/0144161 A1 | 5/2017 | Hindson et al. |
| 2017/0145476 A1 | 5/2017 | Ryvkin et al. |
| 2017/0159109 A1 | 6/2017 | Zheng et al. |
| 2017/0235876 A1 | 8/2017 | Jaffe et al. |
| 2017/0260584 A1 | 9/2017 | Zheng et al. |
| 2018/0030515 A1 | 2/2018 | Regev et al. |
| 2018/0080075 A1 | 3/2018 | Brenner et al. |
| 2018/0105808 A1 | 4/2018 | Mikkelsen et al. |
| 2018/0105864 A1* | 4/2018 | Murtaza ............... C12Q 1/6876 |
| 2018/0312822 A1 | 11/2018 | Lee et al. |
| 2018/0312873 A1 | 11/2018 | Zheng |
| 2018/0340169 A1 | 11/2018 | Belhocine et al. |
| 2018/0371545 A1 | 12/2018 | Wong et al. |
| 2019/0060890 A1 | 2/2019 | Bharadwaj et al. |
| 2019/0060905 A1 | 2/2019 | Bharadwaj et al. |
| 2019/0064173 A1 | 2/2019 | Bharadwaj et al. |
| 2019/0071656 A1 | 3/2019 | Chang et al. |
| 2019/0127731 A1 | 5/2019 | McDermott |
| 2019/0134633 A1 | 5/2019 | Bharadwaj et al. |
| 2019/0176152 A1 | 6/2019 | Bharadwaj et al. |
| 2019/0177800 A1 | 6/2019 | Boutet et al. |
| 2019/0323088 A1 | 10/2019 | Boutet et al. |
| 2019/0345636 A1 | 11/2019 | McDermott et al. |
| 2019/0352717 A1 | 11/2019 | Schnall-Levin |
| 2019/0367997 A1 | 12/2019 | Bent et al. |
| 2019/0376118 A1 | 12/2019 | Belhocine et al. |
| 2020/0005902 A1 | 1/2020 | Mellen et al. |
| 2020/0032335 A1 | 1/2020 | Martinez |
| 2020/0033237 A1 | 1/2020 | Hindson et al. |
| 2020/0033366 A1 | 1/2020 | Alvarado Martinez |
| 2020/0056223 A1 | 2/2020 | Bell |
| 2020/0105373 A1 | 4/2020 | Zheng |
| 2020/0263232 A1 | 8/2020 | Bell et al. |
| 2020/0283827 A1* | 9/2020 | Murtaza ............... C12Q 1/6806 |
| 2020/0291454 A1 | 9/2020 | Belhocine et al. |
| 2020/0407775 A1 | 12/2020 | Bharadwaj et al. |
| 2021/0190770 A1 | 6/2021 | Delaney et al. |
| 2021/0270703 A1 | 9/2021 | Abousoud |
| 2021/0403989 A1* | 12/2021 | Lebofsky ............. C12Q 1/6869 |
| 2022/0162671 A1 | 5/2022 | Pfeiffer et al. |
| 2022/0403375 A1 | 12/2022 | Martinez |
| 2024/0002914 A1 | 1/2024 | Pfeiffer et al. |
| 2024/0044877 A1 | 2/2024 | Price et al. |
| 2024/0272044 A1 | 8/2024 | Bava |

FOREIGN PATENT DOCUMENTS

| | | |
|---|---|---|
| EP | 1967592 B1 | 4/2010 |
| EP | 2540389 A1 | 1/2013 |
| EP | 2635679 B1 | 4/2017 |
| GB | 2097692 A | 11/1982 |
| GB | 2097692 B | 5/1985 |
| WO | WO-84/02000 | 5/1984 |
| WO | WO-95/30782 | 11/1995 |
| WO | WO-99/52708 | 10/1999 |
| WO | WO-2000008212 A1 | 2/2000 |
| WO | WO-2001002850 A1 | 1/2001 |
| WO | WO-0114589 A2 | 3/2001 |
| WO | WO-0190418 A1 | 11/2001 |
| WO | WO--2001089787 A2 | 11/2001 |
| WO | WO-2004002627 A2 | 1/2004 |
| WO | WO-2004065617 A2 | 8/2004 |
| WO | WO-2004069849 A2 | 8/2004 |
| WO | WO-2004091763 A2 | 10/2004 |
| WO | WO-2005021151 A1 | 3/2005 |
| WO | WO-2005049787 A9 | 6/2005 |
| WO | WO-2005082098 A2 | 9/2005 |
| WO | WO-2006040551 A2 | 4/2006 |
| WO | WO-2006078841 A1 | 7/2006 |
| WO | WO-2006096571 A2 | 9/2006 |
| WO | WO-2007081385 A2 | 7/2007 |
| WO | WO-2007081387 A1 | 7/2007 |
| WO | WO-2007089541 A2 | 8/2007 |
| WO | WO-2007133710 A2 | 11/2007 |
| WO | WO-2007140015 A2 | 12/2007 |
| WO | WO-2007147079 A2 | 12/2007 |
| WO | WO-2008021123 A1 | 2/2008 |
| WO | WO-2008109176 A2 | 9/2008 |
| WO | WO-2008121342 A2 | 10/2008 |
| WO | WO-2008134153 A1 | 11/2008 |
| WO | WO-2008150432 A1 | 12/2008 |
| WO | WO-2009011808 A1 | 1/2009 |
| WO | WO-2009015296 A1 | 1/2009 |
| WO | WO-2009085215 A1 | 7/2009 |
| WO | WO-2009152928 A2 | 12/2009 |
| WO | WO-2010033200 A2 | 3/2010 |
| WO | WO-2010104604 A1 | 9/2010 |
| WO | WO-2010117620 A2 | 10/2010 |
| WO | WO-2010148039 A2 | 12/2010 |
| WO | WO-2011028539 A1 | 3/2011 |
| WO | WO-2011047870 A1 | 4/2011 |
| WO | WO-2011056546 A1 | 5/2011 |
| WO | WO-2011066476 A1 | 6/2011 |
| WO | WO-2012048341 A1 | 4/2012 |
| WO | WO-2012061832 A1 | 5/2012 |
| WO | WO-2012083225 A2 | 6/2012 |
| WO | WO-2012106546 A2 | 8/2012 |
| WO | WO-2012112804 A1 | 8/2012 |
| WO | WO-2012112970 A2 | 8/2012 |
| WO | WO-2012116331 A2 | 8/2012 |
| WO | WO-2012142531 A2 | 10/2012 |
| WO | WO-2012142611 A2 | 10/2012 |
| WO | WO-2012149042 A2 | 11/2012 |
| WO | WO-2012166425 A2 | 12/2012 |
| WO | WO-2012167142 A2 | 12/2012 |
| WO | WO-2013019751 A1 | 2/2013 |
| WO | WO-2013036929 A1 | 3/2013 |
| WO | WO-2013055955 A1 | 4/2013 |
| WO | WO-2013096643 A1 | 6/2013 |
| WO | WO-2013126741 A1 | 8/2013 |
| WO | WO-2013134261 A1 | 9/2013 |
| WO | WO-2014028378 A2 | 2/2014 |
| WO | WO-2014108810 A2 | 7/2014 |
| WO | WO-2014165559 A2 | 10/2014 |
| WO | WO-2015015199 A2 | 2/2015 |
| WO | WO-2015044428 A1 | 4/2015 |
| WO | WO-2015164212 A1 | 10/2015 |
| WO | WO-2016040476 A1 | 3/2016 |
| WO | WO-2016061517 A2 | 4/2016 |
| WO | WO-2016126871 A2 | 8/2016 |
| WO | WO-2016168584 A1 | 10/2016 |
| WO | WO-2017015075 A1 | 1/2017 |
| WO | WO-2017066231 A1 | 4/2017 |
| WO | WO-2017180949 A1 | 10/2017 |
| WO | WO-2017184707 A1 | 10/2017 |
| WO | WO-2017197343 A2 | 11/2017 |
| WO | WO-2018039338 A1 | 3/2018 |
| WO | WO-2018091676 A1 | 5/2018 |
| WO | WO-2018119301 A1 | 6/2018 |
| WO | WO-2018119447 A2 | 6/2018 |
| WO | WO-2018172726 A1 | 9/2018 |
| WO | WO-2018191701 A1 | 10/2018 |
| WO | WO-2018213643 A1 | 11/2018 |
| WO | WO-2018226546 A1 | 12/2018 |
| WO | WO-2018236615 A1 | 12/2018 |
| WO | WO-2019028166 A1 | 2/2019 |
| WO | WO-2019040637 A1 | 2/2019 |
| WO | WO-2019083852 A1 | 5/2019 |
| WO | WO-2019084043 A1 | 5/2019 |

(56) References Cited

FOREIGN PATENT DOCUMENTS

| | | |
|---|---|---|
| WO | WO-2019084165 A1 | 5/2019 |
| WO | WO-2019108851 A1 | 6/2019 |
| WO | WO-2019113235 A1 | 6/2019 |
| WO | WO-2019118355 A1 | 6/2019 |
| WO | WO-2019126789 A1 | 6/2019 |
| WO | WO-2019148042 A1 | 8/2019 |
| WO | WO-2019152108 A1 | 8/2019 |
| WO | WO-2019157529 A1 | 8/2019 |
| WO | WO-2019165181 A1 | 8/2019 |
| WO | WO-2019165318 A1 | 8/2019 |
| WO | WO-2019169028 A1 | 9/2019 |
| WO | WO-2019169347 A1 | 9/2019 |
| WO | WO-2019191321 A1 | 10/2019 |
| WO | WO-2019217758 A1 | 11/2019 |
| WO | WO-2020028882 A1 | 2/2020 |
| WO | WO-2020041148 A1 | 2/2020 |
| WO | WO-2020142779 A1 | 7/2020 |
| WO | WO-2020167862 A1 | 8/2020 |
| WO | WO-2020167866 A1 | 8/2020 |
| WO | WO-2020168013 A1 | 8/2020 |
| WO | WO-2020176882 A1 | 9/2020 |
| WO | WO-2020198532 A1 | 10/2020 |
| WO | WO-2021046475 A1 | 3/2021 |
| WO | WO-2021133845 A1 | 7/2021 |
| WO | WO-2021207610 A1 | 10/2021 |
| WO | WO-2021212042 A1 | 10/2021 |
| WO | WO-2021/222302 A1 | 11/2021 |
| WO | WO-2021222301 A1 | 11/2021 |
| WO | WO-2022103712 A1 | 5/2022 |
| WO | WO-2022182682 A1 | 9/2022 |
| WO | WO-2022182785 A1 | 9/2022 |
| WO | WO-2022271908 A1 | 12/2022 |
| WO | WO-2023076528 A2 | 5/2023 |

OTHER PUBLICATIONS

Young, M.D. and Behjati, S. SoupX removes ambient RNA contamination from droplet-based single-cell RNA sequencing data. GigaScience 2020; 9: 1-10 (Year: 2020).*

10X Genomics, Inc. CG000153 Rev A. Chromium Single Cell DNA Reagent Kits User Guide. 2018.

10X Genomics, Inc. CG000184 Rev A. Chromium Single Cell 3' Reagent Kits v3 User Guide with Feature Barcoding Technology for CRISPR Screening. 2018.

10X Genomics, Inc. CG000185 Rev B. Chromium Single Cell 3' Reagent Kits User Guide with Feature Barcoding Technology for Cell Surface Protein. 2018.

10X Genomics, Inc. CG000208 Rev E. Chromium Next GEM Single Cell V(D)J reagent Kits v1.1 User Guide with Feature Barcode Technology for Cell Surface Protein. 2020.

10X Genomics, Inc. CG000209 Rev D. Chromium Next GEM Single Cell ATAC Reagent Kits v1.1 User Guide. 2020.

10X Genomics, Inc. CG000239 Rev B. Visium Spatial Gene Expression Reagent Kits User Guide. 2020.

10X Genomics, Inc. CG00026. Chromium Single Cell 3' Reagent Kit User Guide. 2016.

10X Genomics, Inc. LIT00003 Rev B Chromium Genome Solution Application Note. 2017.

Abate, A.R. et al. "Beating Poisson encapsulation statistics using close-packed ordering" Lab on a Chip (Sep. 21, 2009) 9(18):2628-2631.

Adamson et al., "Production of arrays of chemically distinct nanolitre plugs via repeated splitting in microfluidic devices", Lab Chip 6(9): 1178-1186 (Sep. 2006).

Agasti, S.S. et al. "Photocleavable DNA barcode-antibody conjugates allow sensitive and multiplexed protein analysis in single cell" J Am Chem Soc (2012) 134(45):18499-18502.

Amini, S. et al. "Haplotype-resolved whole-genome sequencing by contiguity-preserving transposition and combinatorial indexing" Nature Genetics (2014) 46:1343-1349 doi:10.1038/ng.3119.

Anna et al.: Formation of dispersions using "flow focusing" in microchannels: Applied Physics Letters, vol. 82, No. 3, pp. 364-366 (2003).

Baret, "Surfactants in droplet-based microfluidics" Lab Chip (12(3):422-433 (2012).

Beer et al. On-Chip, Real-Time, Single-Copy Polymerase Chain Reaction in Picoliter Droplets. Anal Chem 79:8471-8475 (2007).

Braeckmans et al., Scanning the Code. Modern Drug Discovery. 2003:28-32.

Brenner, et al. "In vitro cloning of complex mixtures of DNA on microbeads: physical separation of differentially expressed cDNAs." Proc Natl Acad Sci U S A. Feb. 15, 2000;97(4):1665-70.

Buchman GW, et al. Selective RNA amplification: a novel method using dUMP-containing primers and uracil DNA glycosylase. PCR Methods Appl. Aug. 1993; 3(1):28-31.

Burns, et al. An Integrated Nanoliter DNA Analysis Device. Science. Oct. 16, 1998;282(5388):484-7.

Burns, et al. Microfabricated structures for integrated DNA analysis. Proc Natl Acad Sci U S A. May 28, 1996; 93(11): 5556-5561.

Burns, et al. The intensification of rapid reactions in multiphase systems using slug flow in capillaries. Lab Chip. Sep. 2001;1(1):10-15. Epub Aug. 9, 2001.

Chen, et al. Chemical transfection of cells in picoliter aqueous droplets in fluorocarbon oil. Anal Chem. Nov. 15, 2011;83(22):8816-20. doi: 10.1021/ac2022794. Epub Oct. 17, 2011.

Chien et al. "Multiport flow-control system for lab-on-a-chip microfluidic devices", Fresenius J. Anal Chem, 371:106-111 (Jul. 27, 2001).

Chu, et al. Controllable monodisperse multiple emulsions. Angew Chem Int Ed Engl. 2007;46(47):8970-4.

Clausell-Tormos et al., "Droplet-based microfluidic platforms for the encapsulation and screening of mammalian cells and multicellular organisms", Chem. Biol. 15:427-437 (2008).

Co-pending U.S. Appl. No. 16/434,076, inventor Giresi; Paul, filed Jun. 6, 2019.

Co-pending U.S. Appl. No. 16/434,084, inventor Giresi; Paul, filed Jun. 6, 2019.

Co-pending U.S. Appl. No. 16/434,102, inventors Price; Andrew D. et al., filed Jun. 6, 2019.

Co-pending U.S. Appl. No. 16/737,762, inventors Price; Andrew D. et al., filed Jan. 8, 2020.

Co-pending U.S. Appl. No. 16/737,770, inventors Belhocine; Zahara Kamila et al., filed Jan. 8, 2020.

Co-pending U.S. Appl. No. 16/789,273, inventors Maheshwari; Arundhati Shamoni et al., filed Feb. 12, 2020.

Co-pending U.S. Appl. No. 16/800,450, inventor Katherine; Pfeiffer, filed Feb. 25, 2020.

Co-pending U.S. Appl. No. 17/014,909, inventor Giresi; Paul, filed Sep. 8, 2020.

Co-pending U.S. Appl. No. 17/148,942, inventors McDermott; Geoffrey et al., filed Jan. 14, 2021.

Co-pending U.S. Appl. No. 17/166,982, inventors McDermott; Geoffrey et al., filed Feb. 3, 2021.

Co-pending U.S. Appl. No. 17/175,542, inventors Maheshwari; Arundhati Shamoni et al., filed Feb. 12, 2021.

Co-pending U.S. Appl. No. 17/220,303, inventor Walter; Dagmar, filed Apr. 1, 2021.

Co-pending U.S. Appl. No. 17/318,364, inventors Bava; Felice Alessio et al., filed May 12, 2021.

Co-pending U.S. Appl. No. 17/381,612, inventor Martinez; Luigi Jhon Alvarado, filed Jul. 21, 2021.

Co-pending U.S. Appl. No. 17/512,241, inventors Hill; Andrew John et al., filed Oct. 27, 2021.

Co-pending U.S. Appl. No. 17/517,408, inventors Salmanzadeh; Alireza et al., filed Nov. 2, 2021.

Co-pending U.S. Appl. No. 17/518,213, inventor Lund; Paul Eugene, filed Nov. 3, 2021.

Co-pending U.S. Appl. No. 17/522,741, inventors Zheng; Xinying et al., filed Nov. 9, 2021.

Co-pending U.S. Appl. No. 17/545,862, inventor Katherine; Pfeiffer, filed Dec. 8, 2021.

Co-pending U.S. Appl. No. 17/573,350, inventor Corey; M. Nemec, filed Jan. 11, 2022.

Co-pending U.S. Appl. No. 17/580,947, inventor Gibbons; Michael, filed Jan. 21, 2022.

(56) References Cited

OTHER PUBLICATIONS

Co-pending U.S. Appl. No. 17/957,781, inventor Bava; Felice Alessio, filed Sep. 30, 2022.
Co-pending U.S. Appl. No. 18/046,843, inventor Toh; Mckenzi, filed Oct. 14, 2022.
Co-pending U.S. Appl. No. 18/152,650, inventor Shastry; Shankar, filed Jan. 10, 2023.
Damean, et al. Simultaneous measurement of reactions in microdroplets filled by concentration gradients. Lab Chip. Jun. 21, 2009;9(12):1707-13. doi: 10.1039/b821021g. Epub Mar. 19, 2009.
Drmanac et al., Sequencing by hybridization (SBH): advantages, achievements, and opportunities. Adv Biochem Eng Biotechnol. 2002;77 :75-101.
Duffy et al., Rapid Protyping of Microfluidic Systems and Polydimethylsiloxane, Anal Chem 70:4974-4984 (1998).
Eastburn, et al. Ultrahigh-throughput mammalian single-cell reverse-transcriptase polymerase chain reaction in microfluidic droplets. Anal Chem. Aug. 20, 2013;85(16):8016-21. doi: 10.1021/ac402057q. Epub Aug. 8, 2013.
Esser-Kahn, et al. Triggered release from polymer capsules. Macromolecules. 2011; 44:5539-5553.
Gericke, et al. Functional cellulose beads: preparation, characterization, and applications. Chemical reviews 113.7 (2013): 4812-4836.
Guo, et al. Droplet microfluidics for high-throughput biological assays. Lab Chip. Jun. 21, 2012;12(12):2146-55. doi: 10.1039/c2lc21147e. Epub Feb. 9, 2012.
Gyarmati, et al. Reversible disulphide formation in polymer networks: a versatile functional group from synthesis to applications. European Polymer Journal. 2013; 49:1268-1286.
Hashimshony, et al. CEL-Seq: Single-Cell RNA-Seq by Multiplexed Linear Amplification. Cell Rep. Sep. 27, 2012;2(3):666-73. doi: 10.1016/j.celrep.2012.08.003. Epub Aug. 30, 2012.
Holtze, et al. Biocompatible surfactants for water-in-fluorocarbon emulsions. Lab Chip. Oct. 2008;8(10):1632-9. doi: 10.1039/b806706f. Epub Sep. 2, 2008.
Hug, et al. Measurement of the numbers of molecules of a single mRNA species in a complex mRNA preparation. J Theor Biol. Apr. 21, 2003;221(4):615-24.
Islam, et al. Highly multiplexed and strand-specific single-cell RNA 5' end sequencing. Nat Protoc. Apr. 5, 2012;7(5):813-28. doi: 10.1038/nprot.2012.022.
Jaitin, et al. Massively parallel single-cell RNA-seq for marker-free decomposition of tissues into cell types. Science. Feb. 14, 2014;343(6172):776-9. doi: 10.1126/science.1247651.
Jarosz, M. et al. "Using 1ng of DNA to detect haplotype phasing and gene fusions from whole exome sequencing of cancer cell lines" Cancer Res (2015) 75(suppl5):4742.
Kaper, et al. Supporting Information for "Whole-genome haplotyping by dilution, amplification, and sequencing." Proc Natl Acad Sci U S A. Apr. 2, 2013;110(14):5552-7. doi: 10.1073/pnas.1218696110. Epub Mar. 18, 2013.
Kaper, et al. Whole-genome haplotyping by dilution, amplification, and sequencing. Proc Natl Acad Sci U S A. Apr. 2, 2013;110(14):5552-7. doi: 10.1073/pnas.1218696110. Epub Mar. 18, 2013.
Kenis, et al. Microfabrication Inside Capillaries Using Multiphase Laminar Flow Patterning. Science. 1999; 285:83-85.
Kivioja, et al. Counting absolute Nos. of molecules using unique molecular identifiers. Nat Methods. Nov. 20, 2011;9(1):72-4.
Klein, et al. Droplet barcoding for single-cell transcriptomics applied to embryonic stem cells. Cell. May 21, 2015; 161:1187-1201.
Korlach et al., Methods in Enzymology, Real-Time DNA Sequencing from Single Polymerase Molecules, (2010) 472:431-455.
Koster et al., "Drop-based microfluidic devices for encapsulation of single cells", Lab on a Chip the Royal Soc. of Chem. 8: 1110-1115 (2008).
Lagally, et al. Single-Molecular DNA Amplification and Analysis in an Integrated Microfluidic Device. Anal Chem. Feb. 1, 2001;73(3):565-70.
Lennon et al. A scalable, fully automated process for construction of sequence-ready barcoded libraries for 454. Genome Biology 11:R15 (2010).
Macosko, et al. Highly Parallel Genome-wide Expression Profiling of Individual Cells Using Nanoliter Droplets. Cell. May 21, 2015;161(5):1202-14. doi: 10.1016/j.cell.2015.05.002.
Madl, et al. "Bioorthogonal Strategies for Engineering Extracellular matrices", Madal, Chritopher, Adv. Funct. Master. Jan. 19, 2018, vol. 28, 1706046, pp. 1-21.
Mair, et al. Injection molded microfluidic chips featuring integrated interconnects. Lab Chip. Oct. 2006;6(10):1346-54. Epub Jul. 31, 2006.
McCoy, R. et al. "Illumina TruSeq Synthetic Long-Reads Empower De Novo Assembly and Resolve Complex, Highly-Repetitive Transposable Elements" PLOS (2014) 9(9):e1016689.
Microfluidic ChipShop. Microfluidic product catalogue. Oct. 2009.
Navin. The first five years of single-cell cancer genomics and beyond. Genome Res. Oct. 2015;25(10):1499-507. doi: 10.1101/gr.191098.115.
Nisisako, et al. Droplet formation in a microchannel network. Lab Chip. Feb. 2002;2(1):24-6. Epub Jan. 18, 2002.
Nisisako, T. et al. Droplet Formation in a Microchannel on PMMA Plate. Micro Total Analysis Systems. 2001. Kluwer Academic Publishers. pp. 137-138.
Nisisako, T. et al., Microfluidics large-scale integration on a chip for mass production of monodisperse droplets and particles, The Royal Society of Chemistry: Lab Chip, (Nov. 23, 2007) 8:287-293.
Novak, R et al., "Single cell multiplex gene detection and sequencing using microfluidically generated agarose emulsions" Angew. Chem. Int. Ed. Engl. (2011) 50(2):390-395.
Orakdogen, N. "Novel responsive poly(N,N-dimethylaminoethyl methacrylate) gel beads: preparation, mechanical properties and pH-dependent swelling behavior" J Polym Res (2012) 19:9914.
Perrott, Jimmy. Optimization and Improvement of Emulsion PCR for the Ion Torrent Next-Generation Sequencing Platform. (2011) Thesis.
Peters, B.A. et al. Accurate whole-genome sequencing and haplotyping from 10 to 20 human cells. Nature, 487(7406):190-195 (Jul. 11, 2012).
Plunkett, et al. Chymotrypsin responsive hydrogel: application of a disulfide exchange protocol for the preparation of methacrylamide containing peptides. Biomacromolecules. Mar.-Apr. 2005;6(2):632-7.
Priest, et al. Generation of Monodisperse Gel Emulsions in a Microfluidic Device, Applied Physics Letters, 88:024106 (2006).
Pushkarev et al. "Single-molecule sequencing of an individual human genome," Nature Biotech (2009) 27:847-850.
Ramsey, J.M. "The burgeoning power of the shrinking laboratory" Nature Biotech (1999) 17:1061-1062.
Ramskold et al. (2012) "Full-length mRNA-Seq from single-cell levels of RNA and individual circulating tumor cells" Nature Biotechnology 30(8):777-782.
Roche. Using Multiplex Identifier (MID) Adaptors for the GS FLX Titanium Chemistry Basic MID Set Genome Sequencer FLX System, Technical Bulletin 004-2009, (Apr. 1, 2009) pp. 1-11. URL: http://454.com/downloads/my454/documentation/technical-bulletins/TCB-09004 UsingMultiplexIdentifierAdaptorsForTheGSFLXTitaniumSeriesChemistry-BasicMIDSet.pdf.
Rotem, A. et al., "High-throughput single-cell labeling (Hi-SCL) for RNA-Seq using drop-based microfluidics" PLOS One (May 22, 2015) 0116328 (14 pages).
Saikia, et al. Simultaneous multiplexed amplicon sequencing and transcriptome profiling in single cells. Nat Methods. Jan. 2019; 16(1):59-62. doi: 10.1038/s41592-018-0259-9. Epub Dec. 17, 2018.
Schubert, et al. Microemulsifying fluorinated oils with mixtures of fluorinated and hydrogenated surfactants. Colloids and Surfaces A; Physicochemical and Engineering Aspects, 84(1994) 97-106.
Seiffert, et al. Microfluidic fabrication of smart microgels from macromolecular precursors. Polymer. vol. 51, Issue 25, Nov. 26, 2010, pp. 5883-5889.
Seiffert, S. et al., "Smart microgel capsules from macromolecular precursors" J. Am. Chem. Soc. (2010) 132:6606-6609.

(56) References Cited

OTHER PUBLICATIONS

Shah, et al. "Fabrication of mono disperse thermosensitive microgels and gel capsules in micro fluidic devices", Soft Matter, 4:2303-2309 (2008).
Shendure, et al., Accurate Multiplex Polony Sequencing of an Evolved Bacterial Genome. Science 309.5741 (Sep. 2005): 1728-1732. XP002427180, ISSN: 0036-8075, DOI: 10.1126/SCIENCE.1117839.
Smith, et al. Highly-multiplexed barcode sequencing: an efficient method for parallel analysis of pooled samples. Nucleic Acids Research, 38(13): e142 (2010).
Song, et al. Reactions in droplets in microfluidic channels. Angew Chem Int Ed Engl. Nov. 13, 2006;45(44):7336-56.
Thaxton, C.S. et al. "A Bio-Bar-Code Assay Based Upon Dithiothreitol Oligonucleotide Release" Anal Chem (2005) 77:8174-8178.
Theberge, et al. Microdroplets in microfluidics: an evolving platform for discoveries in chemistry and biology. Angew Chem Int Ed Engl. Aug. 9, 2010;49(34):5846-68. doi: 10.1002/anie.200906653.
Thorsen, et al. Dynamic pattern formation in a vesicle-generating microfluidic device. Physical Review Letters. American Physical Society. 2001; 86(18):4163-4166.
Tonelli, et al. Perfluoropolyether functional oligomers: unusual reactivity in organic chemistry. Journal of fluorine chemistry. 2002; 118(1)107-121.
Turchinovich, et al. "Capture and Amplification by Tailing and Switching (CATS): An Ultrasensitive Ligation-Independent Method for Generation of DNA Libraries for Deep Sequencing from Picogram Amounts of DNA and RNA." RNA Biology 11.7 (2014): 817-828. PMC. Web. Nov. 13, 2017.
Uttamapinant, et al. Fast, cell-compatible click chemistry with copper-chelating azides for biomolecular labeling. Angew. Chem. Int. End. Engl., Jun. 11, 2012: 51(24) pp. 5852-5856.
Wagner, et al. Biocompatible fluorinated polyglycerols for droplet microfluidics as an alternative to PEG-based copolymer surfactants. Lab Chip. Jan. 7, 2016;16(1):65-9. doi: 10.1039/c5lc00823a. Epub Dec. 2, 2015.
Weigl, et al. Microfluidic Diffusion-Based Separation and Detection. Science. 1999; pp. 346-347.
Williams, et al. Amplification of complex gene libraries by emulsion PCR. Nature Methods. 2006;3(7):545-50.
Zhang, et al. One-step fabrication of supramolecular microcapsules from microfluidic droplets. Science. Feb. 10, 2012;335(6069):690-4. doi: 10.1126/science.1215416.
Zheng, et al. Massively parallel digital transcriptional profiling of single cells. Nat Commun. Jan. 16, 2017;8:14049. doi: 10.1038/ncomms14049.
Zheng, X.Y. et al. "Haplotyping germline and cancer genomes with high-throughput linked-read sequencing" Nature Biotech (Feb. 1, 2016) 34(3):303-311.
Zhu, et al. Reverse transcriptase template switching: a SMART approach for full-length cDNA library construction. Biotechniques. Apr. 2001;30(4):892-7.
Co-pending U.S. Appl. No. 18/099,220, inventor Hindson; Benjamin, filed Jan. 19, 2023.
Co-pending U.S. Appl. No. 18/392,684, inventors Fernandes; Sunjay Jude et al., filed Dec. 21, 2023.
Co-pending U.S. Appl. No. 18/643,684, inventor Bava; Felice Alessio, filed Apr. 23, 2024.
Co-pending U.S. Appl. No. 18/743,583, inventor Nagendran; Monica, filed Jun. 14, 2024.
Co-pending U.S. Appl. No. 18/795,976, inventors Meer; Elliott et al., filed Aug. 6, 2024.
Co-pending U.S. Appl. No. 18/824,258, inventor Stott; Ryan Timothy, filed Sep. 4, 2024.
Co-pending U.S. Appl. No. 18/959,351, inventor Schnalll-Levin; Michael, filed Nov. 25, 2024.

* cited by examiner

METHODS AND SYSTEMS FOR PROCESSING POLYNUCLEOTIDES

CROSS-REFERENCE TO RELATED APPLICATIONS

This application is a continuation of U.S. patent application Ser. No. 17/517,408, filed Nov. 2, 2021, now abandoned, which claims the benefit of U.S. Provisional Application No. 63/109,972, filed Nov. 5, 2020.

BACKGROUND

Systems for large-scale, automated processing of single cells for genomic and transcriptomic analyses are rapidly being developed and improved. In these systems, sequential cell and/or nucleic acid processing steps can result in identification of hundreds to thousands of analytes from each of hundreds to tens of thousands of cells in a population. Because the systems are complex, it is desirable to use high quality input cell samples to increase the probability of obtaining good data. Rapid tests for determining cell sample quality prior to input into these systems is desirable.

SUMMARY

Cell samples for use in single cell-based genomic or transcriptomics systems should be of high quality to obtain good results. Cell samples containing extracellular analytes, like DNA or RNA, which may originate from death, rupture and nonviability of cells in the samples, often do not result in nucleotide sequence data representative of single cells. In droplet-based single cell-gene expression approaches, where gene expression libraries are made from RNAs from single cells encapsulated in a droplet, for example, use of cell samples containing extracellular RNA can result in nucleotide sequence libraries containing significant sequences derived from the extracellular RNA, instead of the mRNA originating from the encapsulated cell. In cases where single cell-gene expression libraries are made from cell samples containing particularly large amounts of extracellular RNA, plots of the number of unique molecular identifiers (UMIs) per droplet versus the number of droplets having a given number of UMIs (a so-called "knee plot") may not show the characteristic break in the plot (i.e., the "knee") that demarcates UMIs from encapsulated cell RNA, from UMIs from, for example, contaminating extracellular RNA. In other words, it is not possible to distinguish cells from contaminants.

Herein, methods, compositions and kits are described that, in some examples, are useful to rapidly ascertain presence and amount of extracellular analytes in samples. In some examples, the methods/compositions/kits are useful to ascertain whether a cell sample contains sufficiently low levels of extracellular nucleic acids to yield gene libraries or gene expression libraries having no clones or low numbers of clones from the extracellular nucleic acids. Cell samples can be quickly tested for extracellular nucleic acids before libraries are made from the samples. The methods can also be used to optimize methods for producing cell samples from which libraries will be made (e.g., to determine causes of poor-quality cell samples). In some examples, cells from cell samples having an acceptably low levels of extracellular nucleic acids, may be partitioned into discrete droplets in preparation for library creation from the partitioned cell.

In some examples, disclosed are methods for contacting an analyte with a binding agent attached to a support to bind the analyte to the binding agent, and detecting the bound analyte, binding agents that have bound the analyte, or supports attached to binding agents that have bound an analyte. The methods may include an additional step of labeling the analyte. In some examples, the analyte may be an extracellular analyte from a biological particle. In some examples, the analyte may be an extracellular nucleic acid, including DNA or RNA, from cells in a cell suspension. The analyte may include a label.

In some examples, the binding agent may include a protein, polysaccharide, lipid or nucleic acid. In some examples, the binding agent may be an oligonucleotide capable of binding an analyte. An oligonucleotide binding agent may encode a first nucleotide sequence complementary to a second nucleotide sequence in an analyte. The first nucleotide sequence may hybridize to the second nucleotide sequence. In some examples, the first nucleotide sequence may be a poly(T) sequence capable of hybridizing to poly (A) tail sequences in eukaryotic RNAs. The binding agent may be attached to the support by physical methods, chemical methods, and the like.

In some examples, the support may be made of various substances, including bio-compatible polymers. The support may be a bead. The bead may be a solid bead, gel bead, magnetic bead and the like. The bead may be larger than a biological particle, about the same size as a biological particle or smaller than a biological particle.

Detecting the bound analyte, binding agents that have bound the analyte, or supports attached to binding agents that have bound an analyte may rely on detection of a label that is part of the analyte. Systems used for the detecting may be stationary or flowable systems. In some examples, detecting uses an analytical flow cytometry instrument.

In examples where the methods are directed to detecting analytes in a sample containing cells, dyes and/or antibodies may additionally be used to stain, detect and quantify viable or non-viable cells in the sample.

Kits for performing the disclosed methods are also disclosed.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

The following U.S. patents and U.S. published patent applications are each incorporated by reference in their entirety into this application:

U.S. Pat. No. 9,644,204 (Ser. No. 14/175,935), issued May 9, 2017 and titled, "Partitioning and Processing of Analytes and Other Species";

U.S. Pat. No. 9,975,122 (Ser. No. 14/934,044), issued May 22, 2018 and titled, "Instrument Systems for Integrated Sample Processing";

U.S. Pat. No. 10,053,723 (Ser. No. 15/719,459), issued Aug. 21, 2018 and titled, "Capsule Array Devices and Methods of Use";

U.S. Pat. No. 10,071,377 (Ser. No. 15/687,856), issued Sep. 11, 2018 and titled, "Fluidic Devices, Systems, and Methods for Encapsulating and Partitioning Reagents, and Applications of Same"; and U.S. Pat. No. 10,590,244 (Ser. No. 16/178,430), issued Mar. 17, 2020 and titled, "Compositions, Methods, and Systems for Bead Formation Using Improved Polymers."

Other references incorporated by reference may be listed throughout the application.

BRIEF DESCRIPTION OF THE DRAWINGS

In the accompanying drawings, which are incorporated in and constitute a part of the specification, embodiments of the disclosed inventions are illustrated. It will be appreciated that the embodiments illustrated in the drawings are shown for purposes of illustration and not for limitation. It will be appreciated that changes, modifications and deviations from the embodiments illustrated in the drawings may be made without departing from the spirit and scope of the invention, as disclosed below.

DETAILED DESCRIPTION

Definitions

Figure 1:
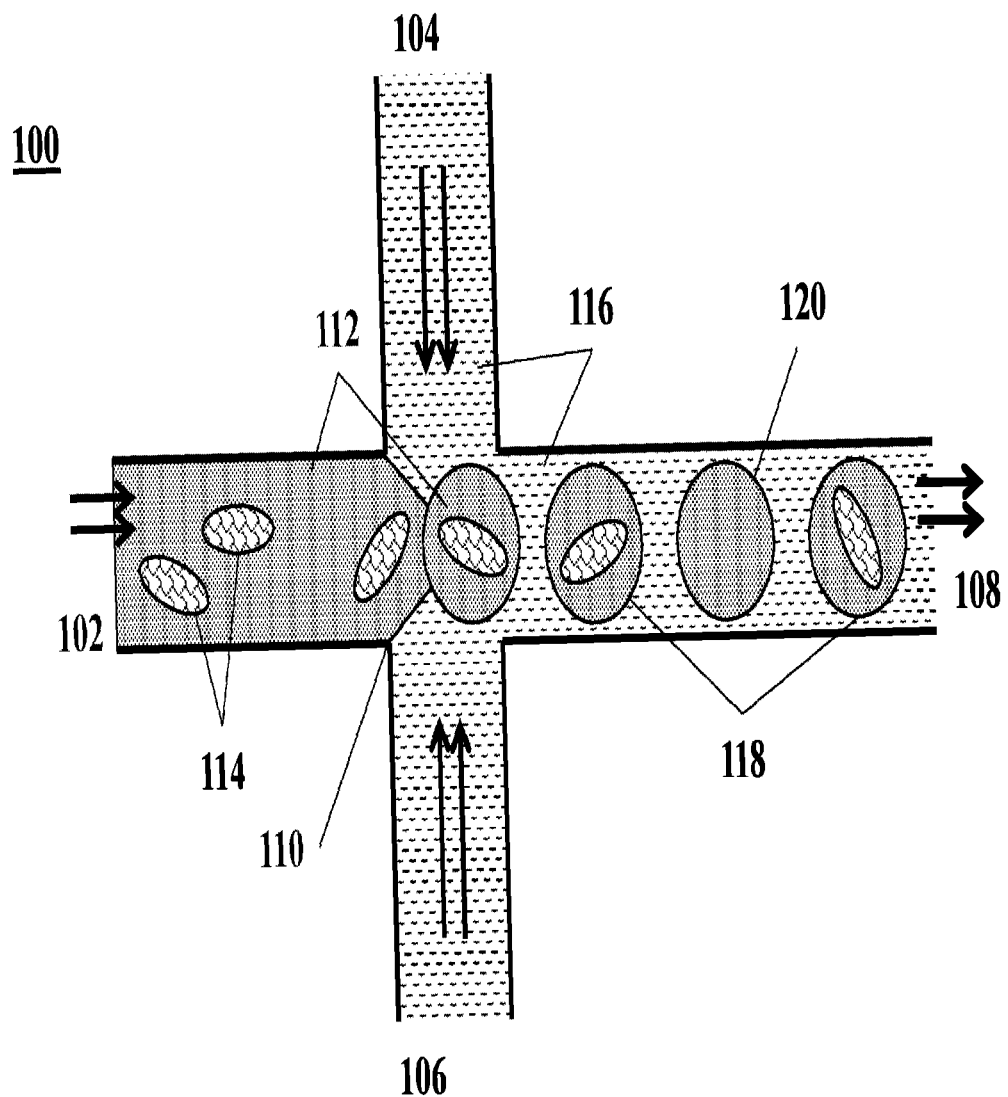
FIG. 1 shows an example of a microfluidic channel structure for partitioning individual biological particles.

Unless defined otherwise, all technical and scientific terms used herein have the same meaning as commonly understood by one of ordinary skill in the art to which the present invention pertains. It is to be understood that the terminology used herein is for describing particular embodiments only and is not intended to be limiting. For purposes of interpreting this disclosure, the following description of terms will apply and, where appropriate, a term used in the singular form will also include the plural form and vice versa.

Herein, "agitate" generally means to move or force violently. Herein, "agitate" may be used to describe a force applied to a continuously flowing liquid to result in droplet formation. "Agitation" is the process of moving or forcing violently.

Herein, "analyte" refers to a substance whose chemical constituents are being identified and/or measured. Generally, this application refers to analytes from and/or produced by cells. Any or all molecules or substance from or produced by a cell may be referred to herein as analytes. Chemically, cellular analytes may include proteins, polypeptides, peptides, saccharides, polysaccharides, lipids, nucleic acids, and other biomolecules.

Herein, "analyze" means to examine or investigate.

Herein, "antibody" generally refers to all types of antibodies, fragments and/or derivatives. Antibodies include polyclonal and monoclonal antibodies of any suitable isotype or isotype subclass. Herein, antibody may refer to, but not be limited to Fab, $F(ab')_2$, Fab' single chain antibody, Fv, single chain, mono-specific antibody, bi-specific antibody, tri-specific antibody, multi-valent antibody, chimeric antibody, canine-human chimeric antibody, chimeric antibody, humanized antibody, human antibody, CDR-grafted antibody, shark antibody, nanobody (e.g., antibody consisting of a single monomeric variable domain), camelid antibody (e.g., from the Camelidae family) microbody, intrabody (e.g., intracellular antibody), and/or de-fucosylated antibody and/or derivative thereof. Mimetics of antibodies are also provided.

Herein, "attach" generally refers to a relationship between separate objects based on forces that link the separate objects. In some examples, two objects may attach to one another because of a covalent bond between the two objects. In some examples, attachment between two objects may not be reversible.

Herein, "barcode," generally refers to a label, or identifier, that conveys or is capable of conveying information about an analyte. A barcode can be part of an analyte. A barcode can be independent of an analyte. A barcode can be a tag attached to an analyte (e.g., nucleic acid molecule) or a combination of the tag in addition to an endogenous characteristic of the analyte (e.g., size of the analyte or end sequence(s)). A barcode may be unique. Barcodes can have a variety of different formats. For example, barcodes can include polynucleotide barcodes; random nucleic acid and/or amino acid sequences; and synthetic nucleic acid and/or amino acid sequences. A barcode can be attached to an analyte in a reversible or irreversible manner. A barcode can be added to, for example, a fragment of a deoxyribonucleic acid (DNA) or ribonucleic acid (RNA) sample before, during, and/or after sequencing of the sample. Barcodes can allow for identification and/or quantification of individual sequencing-reads.

Herein, "bead," generally refers to a particle. The bead may be a solid or semi-solid particle. The bead may be a gel bead. The gel bead may include a polymer matrix (e.g., matrix formed by polymerization or cross-linking). The polymer matrix may include one or more polymers (e.g., polymers having different functional groups or repeat units). Polymers in the polymer matrix may be randomly arranged, such as in random copolymers, and/or have ordered structures, such as in block copolymers. Cross-linking can be via covalent, ionic, or inductive, interactions, or physical entanglement. The bead may be a macromolecule. The bead may be formed of nucleic acid molecules bound together. The bead may be formed via covalent or non-covalent assembly of molecules (e.g., macromolecules), such as monomers or polymers. Such polymers or monomers may be natural or synthetic. Such polymers or monomers may be or include, for example, nucleic acid molecules (e.g., DNA or RNA). The bead may be formed of a polymeric material. The bead may be magnetic or non-magnetic. The bead may be rigid. The bead may be flexible and/or compressible. The bead may be disruptable or dissolvable. The bead may be a solid particle (e.g., a metal-based particle including but not limited to iron oxide, gold or silver) covered with a coating comprising one or more polymers. Such coating may be disruptable or dissolvable. A bead may be porous, non-porous, hollow (e.g., a microcapsule), solid, semi-solid, and/or a combination thereof. Alternatively, or in addition, a bead may be solid, semi-solid, semi-fluidic, fluidic, and/or a combination thereof. A bead is a type of support.

The term "biological particle," as used herein, generally refers to a discrete biological system derived from a biological sample. The biological particle may be a macromolecule, small molecule, virus, cell, cell derivative, cell nucleus, cell organelle, cell constituent and the like. The biological particle may contain multiple individual components, such as macromolecules, small molecules, viruses, cells, cell derivatives, cell nuclei, cell organelles and cell constituents, including combinations of different of these and other components. The biological particle may be or may include DNA, RNA, organelles, proteins, or any combination thereof. These components may be extracellular. In some examples, the biological particle may be referred to as a clump or aggregate of combinations of components. In some instances, the biological particle may include one or more constituents of a cell but may not include other constituents of the cell. An example of such constituents include nucleus or an organelle. A cell may be a live or viable cell. The live cell may be capable of being cultured, for example, being cultured when enclosed in a gel or polymer matrix or cultured when comprising a gel or polymer matrix.

Herein, "bind" generally refers to a relationship between separate objects based on forces that the separate objects can exert on one another. In some examples, two objects may bind one another because of affinity binding or ionic binding. In some examples, binding is specific, as when a receptor binds a ligand. In some examples, binding between two objects may be reversible, or even in an equilibrium.

Herein, "binding agent" refers to a substance or molecule that can bind an analyte.

Herein, "capable" means having the ability or quality to do something.

Herein, "capture" generally refers to the capability of a first substance to interact with and/or bind a second substance, where the second substance is part of a population of other substances. Herein, a cell may be captured. An analyte may be captured. Capturing refers to causing a first substance to capture a second substance.

Herein, "configured to" generally refers to, for example, a component of a system that can perform a certain function.

Herein, "construct," when used as a verb, means to build or make.

Herein, "contact" refers to physical touching of separate substances or objects. "Contacting" refers to causing separate substances to physically touch one another.

Herein, "correlate" means that one thing affects or depends on another thing. "Correlating" refers to identification of the separate things that affect or depend on one another and, in some examples, refers to quantifying the relationship between the separate things.

Herein, "deoxyribonucleic acid" or "DNA" refers to a nucleic acid formed from polymerization of deoxyribonucleotides.

Herein, "detect" means to discover or identify.

Herein, "discrete" means separate or individual.

Herein, "droplet" refers to a small portion of a liquid, generally round or pear-shaped.

Herein, "encapsulate" means to enclose in something.

Herein, "enzyme" refers to a protein or proteins that increase the rate of a reaction, converting substrate into product.

Herein, "extracellular" means outside of or partially outside of a cell (e.g., not completely encompassed by an uninterrupted cell membrane). In some examples, a sample that contains cells may also contain extracellular nucleic acids. In some examples, the extracellular nucleic acids may have been released from cells in the sample. In some examples, some cells in the sample may have lost viability and may release nucleic acids. In some examples, extracellular nucleic acids may be attached to cell membranes or debris from the cells that released the nucleic acids.

Herein, "flow" refers to a moving liquid. "Flowing" refers movement of liquid. Generally, herein, flowing refers to causing a liquid containing cells to contact cell capture moieties. "Flowable" refers to something that is capable of flowing.

Herein, "force" refers to an interaction that, when unopposed, will cause or change the position or movement of an object.

Herein, "functionalize" means to give something the ability to perform a task or function.

Herein, "generate," when used as a verb, means to make or produce.

Herein, "hybridize" refers to a nucleotide sequence of a single-stranded nucleic acid molecule forming a complex with a nucleic acid molecule having a complementary nucleotide sequence. Generally, the complex forms through hydrogen bonding between complementary nucleotide bases in separate nucleic acid molecules.

Herein, "immobile" means not moving or motionless. "Immobilize" refers to an act to make something immobile.

Herein, "incorporate" means make a thing a part of something else.

Herein, "indicative" means suggestive or telling of something.

Herein, "inert" means inactive; chemically inactive.

Herein, "instructions" refers to information stating how something should be done.

Herein, "label," when used as a noun means a thing that, when added to a second thing, makes the second thing visible or able to be seen or tracked. Labeling is the action of making something visible or trackable.

Herein, "library" generally refers to a collection of nucleic acid (e.g., DNA) fragments, generally representative of the nucleic acid sequences of the molecule or molecules (e.g., genome) from which the library is made.

Herein, "modified" means changed. For example, a "modified" nucleotide, ribonucleotide or phosphate may be different than or changed from a nucleotide, ribonucleotide or phosphate normally found in DNA or RNA. In some examples, modified "modified" nucleotides, ribonucleotides or phosphates may contain a detectable label.

Herein, "nucleic acid" refers to linear macromolecules formed from polymerization of units called nucleotides.

Herein, "oligonucleotide" means a linear polymer of nucleotides, in some examples 2'-deoxyribonucleotides. Oligonucleotides are single stranded. Oligonucleotides can be of various lengths.

Herein, "originate" refers to where something came from; the starting material.

Herein, "partition" generally, refers to a space or volume that may be suitable to contain one or more species or conduct one or more reactions or processes. A partition may be a physical compartment, such as a droplet or well (e.g., a microwell). The partition may isolate space or volume from another space or volume. The droplet may be a first phase (e.g., aqueous phase) in a second phase (e.g., oil) immiscible with the first phase. The droplet may be a first phase in a second phase that does not phase separate from the first phase, such as, for example, a capsule or liposome in an aqueous phase. A partition may comprise one or more other (inner) partitions. In some cases, a partition may be a virtual compartment that can be defined and identified by an index (e.g., indexed libraries) across multiple and/or remote physical compartments. For example, a physical compartment may comprise a plurality of virtual compartments.

Herein, "penetrate" means able to get into or through, or to force into or through something. A structure (e.g., a cell) that is impenetrable to something (e.g., a support) means that the thing being referred to cannot or is not able to get into the structure. Likewise, a support may be said to be impenetrable to a cell.

Herein, "primer" means a single-stranded nucleic acid sequence that provides a starting point for DNA synthesis. Generally, a primer has a nucleotide sequence that is complementary to a template, and has an available 3'-hydroxyl group to which a transcriptase or polymerase can add additional nucleotides complementary to corresponding nucleotides in the template, to synthesize a nucleic acid strand in 3' to 5' direction.

Herein, "process," when used herein as a verb, refers to performing one or more operations on a thing, for example, to change the thing.

Herein, "provide" means to make available. Providing is the act of making something available.

Herein, "quantify" means to measure.

Herein, "release" means to come out from something.

Herein, "remove" means to eliminate or get rid of something.

Herein, "ribonucleic acid" or "RNA" refers to a nucleic acid formed from polymerization of ribonucleotides. Messenger RNA (mRNA) is a type of RNA that can be used by ribosomes to translate proteins. mRNA from eukaryotic cells may have a poly(A) tail.

Herein, "sample" generally refers to a collection of something. In some examples, "sample" may refer to a collection of biological particles, which may contain additional molecules or substances. In some examples, a "sample" may refer to a collection of processed biological particles, which may contain additional molecules or substances. In some examples, a biological sample may comprise any number of macromolecules, for example, cellular macromolecules. The sample may be a cell sample. The sample may be a cell line or cell culture sample. The sample can include one or more cells, or one or more cell aggregates or clusters. The biological sample may be derived from another sample. The sample may be a tissue sample, such as a biopsy, core biopsy, needle aspirate, or fine needle aspirate. The sample may be a fluid sample, such as a blood sample, urine sample, or saliva sample. The sample may be a skin sample. The sample may be a cheek swab. The sample may be a plasma or serum sample. The sample may be a blood sample. The sample may contain PBMCs.

Herein, "similar" means resembling or close to, without being identical.

Herein, "single cell" generally refers to a cell that is not present in a aggregate or clump. Single cells generally are desired for use in encapsulating cells to perform cell profiling.

Herein, "specific" means clearly defined or identified.

Herein, "subsequent to" means after.

Herein, "substrate" refers to the molecule or molecules on which an enzyme acts.

Herein, "support," when used as a noun, refers to something that serves, for example, as a foundation, prop, brace or stay for another thing. In some examples, the support may be larger, more easily worked with, or more easily tracked or visualized than the thing being supported. In some examples herein, a bead may be a support for a catalyst or enzyme. A support may be a solid support. In some instances, a support (e.g., a bead) may be dissolvable, disruptable, and/or degradable. In some cases, a support (e.g., a bead) may not be degradable. In some cases, the support (e.g., a bead) may be a gel bead. A gel bead may be a hydrogel bead. A gel bead may be formed from molecular precursors, such as a polymeric or monomeric species. A semi-solid support (e.g., a bead) may be a liposomal bead. A support may comprise one or more metals, such as iron oxide, gold, and silver, or other metal. A support may be magnetic. For example, a support may comprise a magnetic material. In some cases, the support (e.g., a bead) may be a silica bead. In some cases, the support (e.g., a bead) can be rigid. In other cases, the support (e.g., a bead) may be flexible and/or compressible.

Herein, "surface" generally refers to the outside or outer layer of something.

Herein, "suspension" generally refers to particles in a liquid, where the particles will settle on standing. Generally, cells within a liquid (e.g., a liquid buffer) are considered a suspension.

Herein, "template" refers to one single-stranded nucleic acid acting as a "template" for synthesis of another complementary single-stranded nucleic acid. For example, RNA can act as a template for synthesis of a complementary DNA strand synthesized using reverse transcriptase. A single-stranded DNA can act as a template for synthesis of a complementary DNA strand, most often by a DNA polymerase.

Herein, "viable" means alive. Generally, "viability" refers to the extent to which a population of cells is viable. Cells that are not viable generally are referred to as nonviable.

Herein, "vital dye" refers to dyes that differentially stain viable and nonviable cells. In some examples, vital dyes are excluded from staining viable cells, but do stain non-viable cells.

Analytes and Biological Particles

Herein, "analyte" refers to a substance whose chemical constituents are being identified and/or measured. The methods, compositions and kits disclosed in this application may be used to detect many different types of analytes. The methods, compositions and kits disclosed here are not limited to analytes having a particular origin or to analytes of particular types. The analytes may originate from cells or may not originate from cells.

Cellular analytes, or analytes originating from cells, may be used and may include, without limitation, any or all molecules or substances from or produced by a cell. Chemically, cellular analytes may include proteins, polypeptides, peptides, saccharides, polysaccharides, lipids, nucleic acids, combinations thereof and other biomolecules. A cellular analyte may include a protein, a metabolite, a metabolic byproduct, an antibody or antibody fragment, an enzyme, an antigen, a carbohydrate, a lipid, a macromolecule, or a combination thereof (e.g., proteoglycan) or other biomolecule. The cellular analyte may be a nucleic acid molecule. The cellular analyte may be a deoxyribonucleic acid (DNA) molecule or a ribonucleic acid (RNA) molecule. The DNA molecule may be a genomic DNA molecule. The cellular analyte may comprise coding or non-coding RNA. The RNA may be messenger RNA (mRNA), ribosomal RNA (rRNA) or transfer RNA (tRNA), for example. The RNA may be a transcript. The RNA may be small RNA that are less than 200 nucleic acid bases in length, or large RNA that are greater than 200 nucleic acid bases in length. Small RNAs may include 5.8 S ribosomal RNA (rRNA), 5S rRNA, transfer RNA (tRNA), microRNA (miRNA), small interfering RNA (siRNA), small nucleolar RNA (snoRNAs), Piwi-interacting RNA (piRNA), tRNA-derived small RNA (tsRNA) and small rDNA-derived RNA (srRNA). The RNA may be double-stranded RNA or single-stranded RNA. The RNA may be circular RNA.

In some instances, the analytes may be contained in a sample. A sample may contain only analytes or may contain analytes in addition to one or more additional components. In some examples, the sample may contain biological particles. In some examples, biological particles may be cells, parts of cells or cell organelles, like a cell nucleus. A biological particle may include a cell, without any limitation on the kind or type of cell. Cells may be eukaryotic, prokaryotic or archaea. Cells may be eukaryotic cells from a cell line or cell culture sample. A cell may be a mammalian cell. A cell may be an animal cell. A cell may be a human cell. A cell may be from a cell culture. A cell may be from an immortalized cell line. A cell may be from a primary sample, such as a patient sample. A cell may be from a frozen stock of cells (e.g., cryopreserved cells). The cells may be adherent cells or suspension cells. The cells may be from a tissue sample, such as a biopsy, core biopsy, needle aspirate, or fine needle aspirate. The sample containing cells may come from bodily fluids, such as blood, urine or saliva. The sample may be a skin sample. The sample may be a cheek swab. The sample may contain PBMCs. Samples that include parts of or organelles from cells are also encompassed by this disclosure. In some examples, a sample may contain a cell nucleus from a eukaryotic cell.

Examples of cells may comprise a plant cell, animal cell, human cell, insect-derived cells, bacteria, algae, cardiomyocytes, stem cells, neurons, primary neurons, ESCs, iPSCs, hepatocytes, primary heart valve cells, primary hematopoietic cells, gastrointestinal cells, lymphocytes, T-cells, B-cells, natural killer cells, dendritic cells, hematopoietic cells, beta cells, somatic cells, germ cells, embryos (human and animal), zygotes, gametes, and other types of cells.

In some instances, analytes in a sample containing cells may be extracellular analytes. Extracellular analytes may be chemical, biological, or biochemical molecules or particles that are outside of a cell. The extracellular analytes may comprise any kind of molecules, such as nucleic acid molecules, peptides, proteins, substrates, a sequence of nucleic acids, a sequence of amino acids, or other kinds of molecules. Extracellular molecules may comprise extracellular nucleic acid molecules such as DNA and/or RNA or any other types of nucleic acid molecules and/or any combination thereof that are not inside a cell or cell nucleus. In some cases, extracellular molecules may be impurities in the sample.

Extracellular molecules (e.g., extracellular nucleic acid molecules) may also be referred to as free-floating molecules (e.g., free-floating nucleic acid molecules), ambient molecules (e.g., ambient nucleic acid molecules), and/or background molecules (e.g., background nucleic acid molecules). Extracellular molecules may comprise molecules in a sample that are not inside a cell or cell nucleus which may act as impurities and may interfere with the quality of data obtained from analyzing the cells or cell nuclei of the sample. In some cases, extracellular molecules may be present without interfering with the quality of data obtained from analyzing the cells or cell nuclei of the sample.

In some instances, the extracellular molecules may comprise molecules such as extracellular peptides, proteins, substrates, a sequence of amino acids, chemicals, impurities and/or any combination thereof. For example, a sample comprising a cell or cell nucleus may further comprise extracellular molecules such as proteins and/or peptides.

In some instances, the extracellular molecules may comprise or be extracellular nucleic acid molecules. The extracellular nucleic acid molecules may comprise ribonucleic acid (RNA) or deoxyribonucleic acid (DNA). In some examples, extracellular nucleic acid may comprise at least one of messenger RNA (mRNA), chromosome, and genomic DNA (gDNA). In some examples, the extracellular nucleic acid molecules may comprise a size of at least about 5 base pairs (bp) or nucleotides (nt), for example, at least about 5 bp or nt, 10 bp or nt, 15 bp or nt, 20 bp or nt, 25 bp or nt, 30 bp or nt, 35 bp or nt, 40 bp or nt 50 bp or nt, 60 bp or nt, 70 bp or nt, 80 bp or nt, 90 bp or nt, 100 bp or nt, 200 bp or nt, 300 bp or nt, 400 bp or nt, 500 bp or nt, 600 bp or nt, 700 bp or nt, 800 bp or nt, 900 bp or nt, 1 kbp or knt, or larger in size. In some instances, extracellular nucleic acid molecules may be equal to or smaller than about: 500 bp or nt, 400 bp or nt, 300 bp or nt, 200 bp or nt, 100 bp or nt, 50 bp or nt, 40 bp or nt, 30 bp or nt, 20 bp or nt, 10 bp or nt, 5 bp or nt, or smaller, for example smaller than 50 bp or nt.

In some cases, an extracellular nucleic acid molecule (e.g., chromosome) may comprise a size of at least about 0.01 inch, 0.05 inch, 0.1 inch, 0.2 inch, 0.3 inch, 0.4 inch, 0.5 inch, 0.6 inch, 0.7 inch, 0.8 inch, 0.9 inch, 1 inch, 1.1 inch, 1.2 inch, 1.3 inch, 1.4 inch, 1.5 inch, 1.6 inch, 1.7 inch, 1.8 inch, 1.9 inch, 2 inch, 2.1 inch, 2.2 inch, 23 inch, 2.4 inch, 2.5 inch, or more. In some instances, an extracellular nucleic acid molecule (e.g., chromosome) may comprise a size of at least about 1 nanometer(s) nm, 2 nm, 3 nm, 4 nm, 5 nm, 6 nm, 7 nm, 8 nm, 9 nm, 10 nm, 20 nm, 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, 1 micrometer(s) (μm), 2 μm, 3 μm, 4 μm, 5 μm, 6 μm, 7 μm, 8 μm, 9 μm, 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 millimeter(s) mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 nm, 400 mm, 500 mm, 600 mm, 700 mm, 800 mm, 900 mm, 1 centimeter(s) m, 2 cm, 3 cm, 4 cm, 5 cm, 6 cm, 7 cm, 8 cm, 9 cm, 10 cm, or larger.

Extracellular analytes (e.g., extracellular nucleic acid molecules) may have been released in the sample from a cell or cell nucleus, for example, as a result of processing, treating, or manipulating a sample comprising a cell and/or a cell nucleus (e.g., during sample preparation). Such processing may have caused cell lysis or a loss of the integrity of the cell membrane and/or the nuclear membrane. This phenomenon may occur in any kind of cell, such as any cell type listed elsewhere herein or other types of cells. In some cases, a cell type that is more fragile may be more prone to getting lysed during sample preparation. Such cell type may be more likely to release extracellular molecules in the sample. Alternatively, the extracellular molecules (e.g., extracellular nucleic acid molecules) may have other origins and/or causes. Recognized is a need to address a contamination (or cross-contamination) of a sample with extracellular molecules (e.g., extracellular nucleic acid molecules) and their interference with data analysis (e.g., single cell analysis such as single cell sequencing or other sample processing and analysis techniques or procedures).

In some instances, the presence of extracellular molecules (e.g., extracellular nucleic acid molecules) in a sample comprising cells and/or cell nuclei may adversely affect and/or at least to some extent compromise the precision or quality of the results of the analysis (e.g., single cell analysis and/or data clustering results). For example, the goal may be to analyze the nucleic acid molecules in the cells and/or cell nuclei (e.g., intracellular nucleic acid molecules) of the sample. The method may further comprise clustering the data generated for the cells and/or the cell nuclei of the sample into more than one subpopulation (e.g., cluster the cell into multiple subpopulations). The method may further comprise identifying combinations of characteristics and/or parameters (e.g., markers) that may provide important information regarding each subpopulation and/or define the subpopulation in terms of a given state or condition of the sample or the subject, for example a disease marker or a diagnosis of the subject. The presence of extracellular molecules such as extracellular nucleic acid molecules may interfere with such clustering and/or identification in one or more ways. This phenomenon may also be referred to as cross-contamination. For example, the presence of extracellular molecules (e.g., ambient or background molecules such as nucleic acid molecules) may cause two or more subpopulations to blend together and the data (e.g., signal or sequencing reads) relating to a cell, cell nucleus, and/or the intracellular nucleic acid molecules thereof to be detected or categorized across two or more subpopulations. Extracellular molecules (e.g., extracellular nucleic acid molecules) may cause artifacts and/or noise in the data, alter the number of subpopulations resulted from the cluster analysis, interfere with the data in other ways, and/or any combinations thereof. This may cause imprecision in data and may adversely affect interpretation of results and/or decision making based on such data and/or data clustering. Therefore, depending on the application, there may be a need to ascertain the composition of a sample prior to use in, for example, single cell processing, including partitioning.

In some instances, the extracellular molecules (e.g., extracellular nucleic acid molecules), such as nucleic acid molecules inside a sample that are external to a cell or cell nucleus may generate information, such as signals (e.g., sequence reads) during sample processing and/or analysis. For example, a sample comprising a cell or cell nucleus which also comprises extracellular nucleic acid molecules may be subjected to processing and analysis, for example, single cell sequencing (e.g., single cell RNA sequencing). In such case, the signals obtained from the extracellular nucleic acid molecules may be considered noise and may contaminate the data obtained from the intracellular nucleic acid molecules or data obtained from the nucleic acid molecules inside the cell nuclei. In this example, digesting or otherwise decreasing or removing the extracellular nucleic acid molecules from the sample (e.g., prior to sequencing) may enhance the quality of the single cell sequencing data and a clustering thereof.

In some instances, reduced amounts of extracellular molecules (e.g., extracellular nucleic acid molecules) or an absence thereof in the composition (e.g., processed sample) may result in more precise and/or more informative data with reduced noise, artifacts, imprecision, and/or error. Such data may comprise higher quality and may result in improved interpretation of results and/or more informed decision making. In some cases, the elimination of extracellular molecules (e.g., extracellular nucleic acid molecules) may reduce the time and expense of data analysis, for example by providing cleaner data comprising reduced noise.

Binding Agents

Herein, "binding agent" refers to a substance or molecule that can bind an analyte. In some cases, a binding agent may be designed to bind a specific analyte or group of related analytes. In other cases, the binding specificity of a binding agent may be less specific or nonspecific. Binding agents may be designed to bind any type of molecule. For example, binding agents may be designed to bind proteins, polysaccharides, lipids, nucleic acids, and the like. Example binding agents may include any type of molecule, including peptides, polypeptides, proteins, saccharides, polysaccharides, lipids, nucleic acids, combinations thereof, and the like.

In some examples, binding agents contain nucleotide sequences that can capture other, complementary nucleotide sequences through hybridization. In some examples, binding agents that contain nucleotide sequences that can capture complementary nucleotide sequences are oligonucleotides. The sequences within oligonucleotides that hybridize to complementary nucleotide sequences may be used to hybridize to complementary nucleotide sequences that are part of an analyte that includes DNA and/or RNA sequences. In some examples, the nucleotide sequences may be used to hybridize to specific target nucleic acid molecules in a specific analyte, that may include a specific type of RNA (e.g., mRNA) or may be designed to hybridize to, for example, an mRNA that encodes a specific protein. The nucleotide sequences in binding agents may also be designed to hybridize to broader groups of analytes. In some examples, a nucleotide sequence in a binding agent may be designed to hybridize to mRNA molecules. Such a nucleotide sequence may include a poly(T) sequence, that can hybridize to RNA containing a poly(A) sequence, as found in many eukaryotic mRNAs.

In some examples, binding agents may be antibodies, antibody fragments or aptamers. In some examples, binding agents may be receptors or receptor-like substances capable of binding ligands. Binding agents may include poly(A) binding proteins (PAB or PABP), which include RNA binding proteins which bind to the poly(A) tail of eukaryotic mRNAs. Binding agents may include anti-RNA antibodies.

Binding agents may have various affinities for analytes that they bind. In some examples, binding agents have a high enough affinity for an analyte such that the binding survives various manipulations of binding agents and supports that may be part of the disclosed methods (e.g., forces such as those applied during centrifugation).

In some examples, binding agents disclosed herein are attached to a support, as described in the section on supports. Generally, binding agents that are associated with a support are binding agents that retain binding activity when attached to the support.

Supports

Herein, binding agents as disclosed herein may be attached to a support. In some instances, the support may be a bead, polymeric matrix, a plane (e.g., a horizontal or vertical planar surface), a tube wall, a pipette tip, a column surface, a micropillar, an array, a well (e.g., one or more surfaces of a well), a particle, a nanoparticle, a molecule, a large molecule, a protein, a peptide, or any combination thereof.

The support may be a planar surface. The support may be made of any material. In some examples, the support may be made of a polymeric material. The polymeric material may be any polymeric material provided elsewhere herein. The support or bead may be any support provided elsewhere herein, such as any bead provided elsewhere herein. The support may comprise a polymer, such as a synthetic polymer. As an example, a polymer may comprise or be a monolith. A support may be porous or microporous, such as a microporous monolith. In some instances, a support (e.g., bead) may be made of binding agents. For example, binding agents may be combined or agglomerated such that the combination forms a particle.

A support may be a solid support. In some instances, a support (e.g., a bead) may be dissolvable, disruptable, and/or degradable. In some cases, a support (e.g., a bead) may not be degradable. In some cases, the support (e.g., a bead) may be a gel bead. A gel bead may be a hydrogel bead. A gel bead may be formed from molecular precursors, such as a polymeric or monomeric species. A semi-solid support (e.g., a bead) may be a liposomal bead. A support may comprise one or more metals, such as iron oxide, gold, and silver, or other metal. A support may be magnetic. For example, a support may comprise a magnetic material. In some cases, the support (e.g., a bead) may be a silica bead. In some cases, the support (e.g., a bead) can be rigid. In other cases, the support (e.g., a bead) may be flexible and/or compressible.

In some instances, the support may be a sphere (e.g., a solid sphere or a gel sphere). The support may be a spherical bead, such as a solid magnetic sphere. The diameter of the sphere may be at least about 0.1 micrometer (µm), 0.2µ, 0.3 µm 0.4µ m 0.5µ m 0.6 µm 0.7µ m 0.8µ m 0.9µ, 1 µm, 2 µm, 3 µm, 4 µm, 5 µm, 6 µm, 7 µm, 8 µm, 9 µm, 10 µm, 12 µm, 14 µm, 16 µm, 18 µm, 20 µm, 30 µm, 40 µm, or larger in size. In some examples, the diameter may be between about 1 micrometer (µm) to 20 micrometers (µm). The diameter may be from about 5 micrometers (µm) to 10 micrometers (µm). Alternatively, the diameter may comprise other sizes. Alternatively, the support may comprise a different shape and/or size.

The plurality beads used in the embodiments can be of uniform size or they can comprise a collection of heterogeneous sizes. In some cases, the diameter of a bead is at least about 1 micron (µm), 5 µm, 10 µm, 20 µm, 30 µm, 40 µm, 50 µm, 60 µm, 70 µm, 80 µm, 90 µm, 100 µm, 250 µm, 500 µm, 1000 µm (1 mm), or greater. In some cases, a bead may have a diameter of less than about 1 µm, 5 µm, 10 µm, 20 µm, 30 µm, 40 µm, 50 µm, 60 µm, 70 µm, 80 µm, 90 µm, 100 µm, 250 µm, 500 µm, 1 mm, or less. In some cases, a bead may have a diameter in the range of about 40-75 µm, 30-75 µm, 20-75 µm, 40-85 µm, 40-95 µm, 20-100 µm, 10-100 µm, 1-100 µm, 20-250 µm, or 20-500 µm.

The beads useful in the methods and compositions of the present disclosure can comprise a range of natural and/or synthetic materials. For example, a bead can comprise a natural polymer, a synthetic polymer or both natural and synthetic polymers. Examples of natural polymers include proteins and sugars such as deoxyribonucleic acid, rubber, cellulose, starch (e.g., amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly(ethylene oxide), poly(ethylene terephthalate), polyethylene, polyisobutylene, poly(methyl methacrylate), poly(oxymethylene), polyformaldehyde, polypropylene, polystyrene, poly (tetrafluoroethylene), poly(vinyl acetate), poly(vinyl alcohol), poly(vinyl chloride), poly(vinylidene dichloride), poly(vinylidene difluoride), poly(vinyl fluoride) and/or combinations (e.g., co-polymers) thereof. Beads may also be formed from materials other than polymers, including lipids, micelles, ceramics, glass-ceramics, material composites, metals, other inorganic materials, and others. In some examples, the bead useful in the embodiments disclosed herein comprise a hydrogel. Such gel beads can be formed from molecular precursors, such as a polymeric or monomeric species, that undergo a reaction to form crosslinked gel polymer. Another semi-solid bead useful in the present disclosure is a liposomal bead. In some embodiments, beads used can be solid beads that comprise a metal including iron oxide, gold, and silver. In some cases, the bead may be a silica bead. In some cases, the bead can be rigid. In other cases, the bead may be flexible and/or compressible. Generally, the beads can be of any suitable shape. Examples of bead shapes include, but are not limited to, spherical, non-spherical, oval, oblong, amorphous, circular, cylindrical, and variations thereof. Example beads can be porous, non-porous, solid, semi-solid, semi-fluidic, fluidic, and/or a combination thereof. In some embodiments, the bead can be made of a material that is dissolvable, disruptable, and/or degradable, such as a gel bead comprising a hydrogel. Alternatively, in some embodiments, the bead is not degradable.

In some instances, the bead may be a solid bead or a gel bead. The gel bead may be a gel bead provided elsewhere herein. In some examples, the support may be magnetic. For example, the support may be a bead, and the bead may be a magnetic bead. The bead may be a gel bead comprising magnetic particles. The bead may be a solid magnetic microsphere. For example, the support may be a solid microsphere. A magnetic bead may be configured to be separated from the sample using a magnetic or electromagnetic force. Alternatively, the bead may not be magnetic. The bead may be configured to be separated from the sample using techniques other than using a magnetic or electromagnetic force.

In some instances, the binding agent may be permanently or removably attached to the support or a surface thereof, be inside the support, or a combination thereof. For example, the binding agent may be immobilized on a surface of the support. The binding agent may comprise a linker that may be configured to bind a moiety of the surface of the support. For example, the binding agent may be immobilized on a surface of the support by an affinity-tag, entrapment, linkage, cross-linkage, covalent bond, or any combination thereof. In an example, a carbohydrate moiety of the binding agent may bind the support (e.g., a gel). In some examples, a gel may comprise agarose, polymer, silica, gel beads, or other kinds of gels. The support may comprise a surface moiety or linker which may be configured to bind the binding agent. A support may have a single attached binding agent or multiple attached binding agents.

In some instances, attachment of the binding agent to the support may comprise adsorption of the binding agent onto the support (e.g., a matrix). In another example, the binding agent may be included in a gel, such as an inorganic gel by a method such as entrapment. Attachment may comprise chemical attachment (e.g., covalent immobilization). The binding agent may be bound to the surface of the support (e.g., adsorbent surface). For example, a binding agent may be attached to a support such as a solid support. In some cases, the bond may remain strong in a wide range of pH, temperature, and/or reaction medium composition. In an example, a reaction (e.g., a direct reaction) may be performed between amino groups of the binding agent and the support (for example, an epoxy group present in an example support). In another example, a reaction may be performed between a support with an aldehyde-polymer spacer bound to a surface of an example support (e.g., a surface of a monolith support which may be porous).

In some instances, the support and/or the binding agent may be configured to be impenetrable to biological particles, including cells. In some instances, the support and/or the binding agent may not cause physical, chemical, biological, or other kinds of damage to cells. In some instances, the support and/or the binding agents attached thereto may not trigger apoptosis to cells, may not alter cellular metabolism, may not interfere with an integrity of the membrane of the cell, may be inert to the cell, may be safe to the cells, and/or may be compatible for using with a sample comprising a cell.

In some instances, the support (e.g., a bead, a molecule, or other kind of support) may be configured to be impenetrable or substantially impenetrable to a cell. For example, under the assay conditions, when the support comprising a binding agent is brought into contact with the sample comprising a cell and/or cell nucleus, the support (e.g., bead) and/or the bind agent thereof may not penetrate the cell and/or the cell nucleus. Such assay conditions may comprise temperature, pressure, pH, chemicals, reagents and concentrations thereof, the concentration of the support in the sample, a turbulence in the sample (e.g., due to mixing, vortexing, or other factors), any kind of stimuli that may affect a penetration of the support to the sample. For example, the support may comprise a size and/or shape that may prevent it from penetrating the cell. The size and/or shape of the support may be provided elsewhere herein. Alternatively, the size and/or shape of the support alone may not prevent it from penetrating the cell or cell nucleus, and other assay conditions may be adjusted and/or optimized to prevent the support from penetrating the cell. For example, the temperature of the assay may be adjusted to optimize cell viability and/or to minimize a penetration of the support to the cell or cell nucleus.

In some instances, the support (e.g., a bead) may not comprise a binding agent. A support not comprising a binding agent may or may not bind an analyte. A support not comprising a binding agent may bind a particular analyte specifically or may bind analytes nonspecifically. In some examples, the method may comprise providing a support configured to bind or attach to an extracellular analyte (e.g., an extracellular nucleic acid molecule). In some examples, the support (e.g., bead) may comprise a coating. The coating may be configured to bind or attach to an extracellular molecule. The coating may be a chemical, a biological, or biochemical coating. In some examples, the coating may comprise a biological particle. Examples of coatings may comprise a molecule or particle such as a nucleic acid molecule, a nucleotide, a sequence of nucleotides, oligonucleotide, a polynucleotide, a double-stranded DNA, RNA, a sequence of amino-acids, a peptide, a virus, a virus DNA, ssDNA, an aptamer, or another molecule. The molecules of the coating may capture extracellular analytes.

In some instances, the support and/or the binding agents attached thereto may be compatible to be used with cells and cell nuclei, such that the cell or cell nuclei in the sample would not be compromised and/or affected by the support and/or binding agent attached thereto. For example, the support and or binding agent thereof (e.g., attached thereto) may not alter or affect cellular metabolism, biochemical pathways, intracellular activities, cell organelles, cell viability or functions (e.g., under assay conditions).

In some instances, the support may be configured to be inert or substantially inert to cellular metabolism and intracellular activities. The support and/or binding agent thereof (e.g., attached thereto) may maintain the integrity of the cells or cell nuclei in the sample for at least about 1%, 5%, 10%, 20%, 30%, 40%, 50%, 60%, 70%, 80%, 90%, 99%, or to a greater extent. For example, an integrity of the membrane of the cell and/or nucleus may be substantially maintained. A viability of the cells of the sample may be maintained for at least about 1%, 5%, 10%, 20%, 30%, 40%, 50%, 60%, 70%, 80%, 90%, 99%, or more. The support and or binding agent (e.g., attached thereto) may not trigger apoptosis in the cells.

In some instances, the support may be insoluble in a sample. The sample may comprise a buffer and/or medium. The medium or buffer may be suitable for performing an assay. A buffer may be suitable for providing a condition for the binding agent (e.g., the binding agent attached to the surface of the support). The buffer may comprise a given composition (e.g., composition of chemical reagents with given concentrations) and given pH. The support may be insoluble in the sample and/or the buffers thereof under the given conditions. Alternatively, in some cases, the support may be at least partially soluble in the sample. In some instances, the solution of the support in the sample may not hinder performing the assay and/or adversely affect the data.

In some instances, the support may be separable from a sample. The method may further comprise separating the support from the sample. In some examples, the method may comprise separating the support from the sample using a magnetic or electromagnetic force. In other examples, other separation techniques may be used as an alternative or in combination with magnetic separation. Such methods may comprise physical separation, mechanical separation, application of a mechanical force, or other method. A mechanical force may comprise a rotational force, a shear stress, a turbulence, a mechanical force due to fluid flow, pressure, gravity, magnetic enrichment, magnetic force or another force. In some examples, a support may be a magnetic support configured to be separated from the sample via a magnetic or electromagnetic force. For example, a bead may be a solid magnetic sphere or a gel bead comprising magnetic particles. Magnetic beads and magnetic separation may be according to the methods, systems, kits, an/or compositions described in further detail elsewhere herein. Separation techniques may comprise magnetic separation (e.g., separating supports from the sample via a magnetic or electromagnetic force), centrifugation, filtration (e.g., ultrafiltration), using a filter, sorting in a device, using a microfluidic device, a device comprising features configured to trap or otherwise separate the supports, other separation techniques, and/or any combination thereof.

Methods

The methods disclosed here are generally applicable to contacting an analyte with a binding agent. Generally, the binding agent is attached to a support. The binding agent binds the analyte. The bound analyte, a binding agent that has bound the analyte and/or a support with an attached binding agent that has bound the analyte is detected as part of the method. In some examples, in addition to or alternatively to this method, a support and/or binding agent that has bound an analyte is removed from a system or sample that contains the analyte. When this is done, the analyte (e.g., extracellular RNA) is removed from the system or sample. In some examples, such systems or samples may contain biological particles, like cells, and removal of the analyte leaves the biological particles. The remaining cells may be additionally processed, through single cell-based droplet systems, for example.

Figure 7:
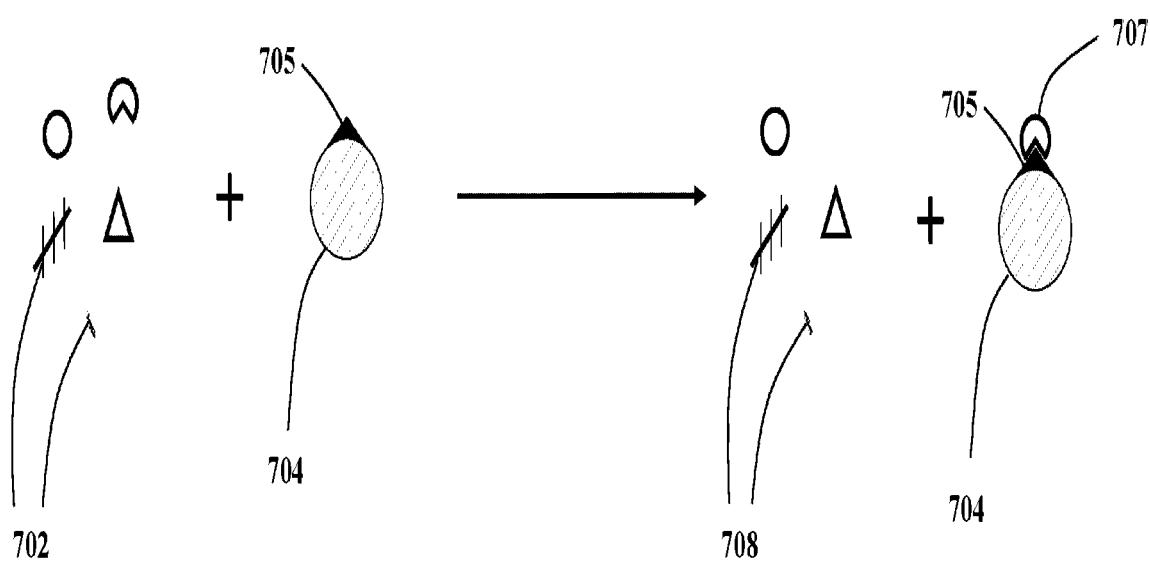
FIG. 7 shows an example method disclosed herein.

In some examples, a method disclosed herein is illustrated in FIG. 7. In the method 700, analytes 702 (the different analyte shapes indicate different analytes, e.g., a protein, a nucleic acid, and the like) are contacted with a binding agent 705 attached to a support 704, as shown to the left of the arrow in the illustration. In this example method 700, the support 704 is illustrated as a bead. In the illustration, the binding agent 705 is configured to bind to a specific analyte 707, which is shown on the right side of the arrow in the illustration (e.g., a nucleic acid, like RNA, and not a protein). Analytes for which the binding agent 705 is not configured to bind 708 are also shown as not bound by the binding agent. The example method 700 illustrates binding of a "specific" analyte, which may be a nucleic acid, an RNA for example.

Figure 8:
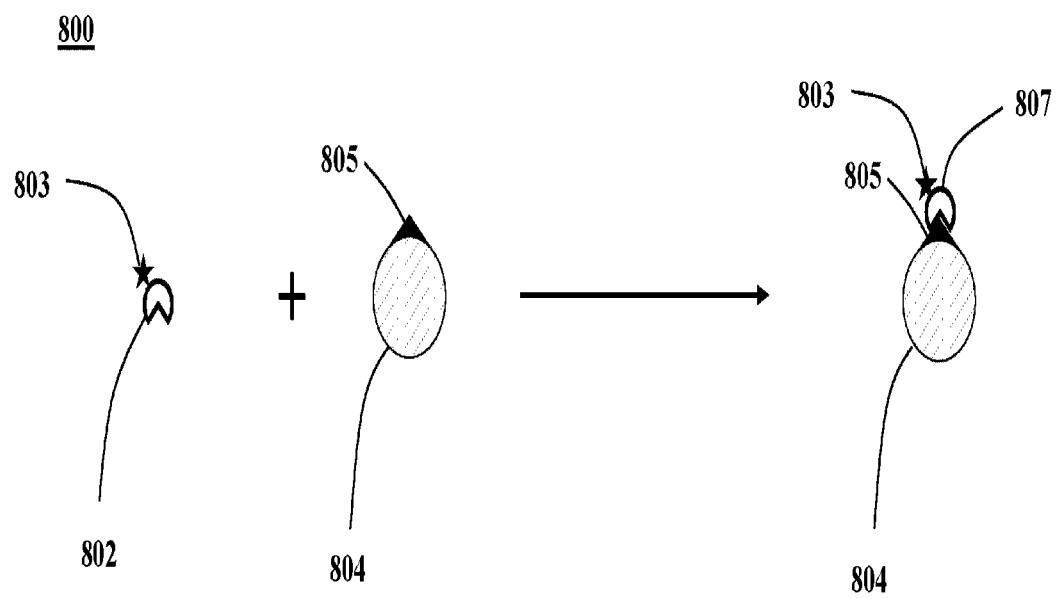
FIG. 8 shows another example method disclosed herein.

In some examples, a method disclosed herein is illustrated in FIG. 8. In the method 800, an analyte 802 includes a label 803. The label 803 may be associated with or attached to the analyte 802. When the analyte 802 is contacted with a binding agent 805 specific for the analyte 802, here attached to a support 804 that is illustrated as a bead (left side of the arrow in the illustration), the binding agent 805 binds the bound analyte 807 that includes the label 803 (right side of the arrow). In this example process, the support 804 is detectable after the binding agent 805 attached to the support binds the bound analyte 807, because of the label 803 included in the bound analyte 807. In some examples, detection and/or quantifying of the detectable supports 804, is used to determine the quality of a sample containing cells and the analytes. In some examples, the bound analyte 807 may be RNA.

Extracellular analytes in a sample may be labeled by methods known in the art prior to performing the method illustrated in FIG. 8. In other examples, a binding agent attached to a support may bind an unlabeled analyte (e.g., see FIG. 7) and methods may be used to label the bound analyte without labeling unbound analytes. Methods may be used to label binding agents that bind analyte, while not labeling binding agents that have not bound analyte. Methods may be used to label a support attached to a binding agent that has bound analyte, while not labeling supports attached to binding agents that have not bound analyte. In some examples, a binding agent and/or support may be configured so they become detectable after an analyte is bound by the binding agent. In some examples, binding agents that have bound an analyte, or supports attached to binding agents may be separated from binding agents/supports that have not bound analyte, so that binding agents/supports that are associated with bound analyte is separately quantifiable. There are multiple methods known in the art whereby a bound analyte, a binding agent that has bound an analyte, or a support attached to a binding agent that has bound an analyte may be detected and quantified. This disclosure encompasses those methods in their entirety.

In some examples, the analytes sought to be detected and/or quantified in samples containing cells are nucleic acids, particularly DNA and/or RNA. Cell samples of good quality will generally contain little extracellular DNA and RNA. Using the methods described here, one can screen cell samples, prior to using the samples in single cell-based droplet systems, to eliminate poor quality samples from being used in the systems. To determine what is an acceptable amount of extracellular RNA in a sample, for example, preliminary experiments may be performed to compare and correlate the amount of extracellular RNA in a sample (determined using the methods disclosed here) with "knee plots" from nucleotide sequence libraries prepared from cells in the sample. Once amounts of extracellular RNA are correlated with the shape of the curve in a knee plot, one can use the assays described herein to determine levels of extracellular RNA in a sample and infer the quality of libraries that would result from cells in the sample.

In some examples, including instances where the support is a bead, detecting bound analytes, binding agents and/or supports may use stationary systems and/or flowable systems. An example stationary system may include bound analyte in a sample contained in a well of a microtiter plate. A microtiter plate reader may be used to detect a readout from a bound analyte in the individual wells. An example flowable system may include bound analytes in a sample that are analyzed by an analytical flow cytometry instrument. In some examples, a sample containing cells and beads that have bound fluorescently-labeled extracellular RNA may be processed by a flow cytometry. For example, the flow cytometer may be configured to trigger data acquisition by particles having a particular size, density, etc., using forward and/or side light scatter. Fluorescence of particles that are beads (as distinguished from cells) may be collected to detect extracellular RNA in the sample. In the same experiment, the proportion of cells in the sample that are live versus dead may be determined using staining methods (e.g., viable dyes) well known in the art.

Figure 9:
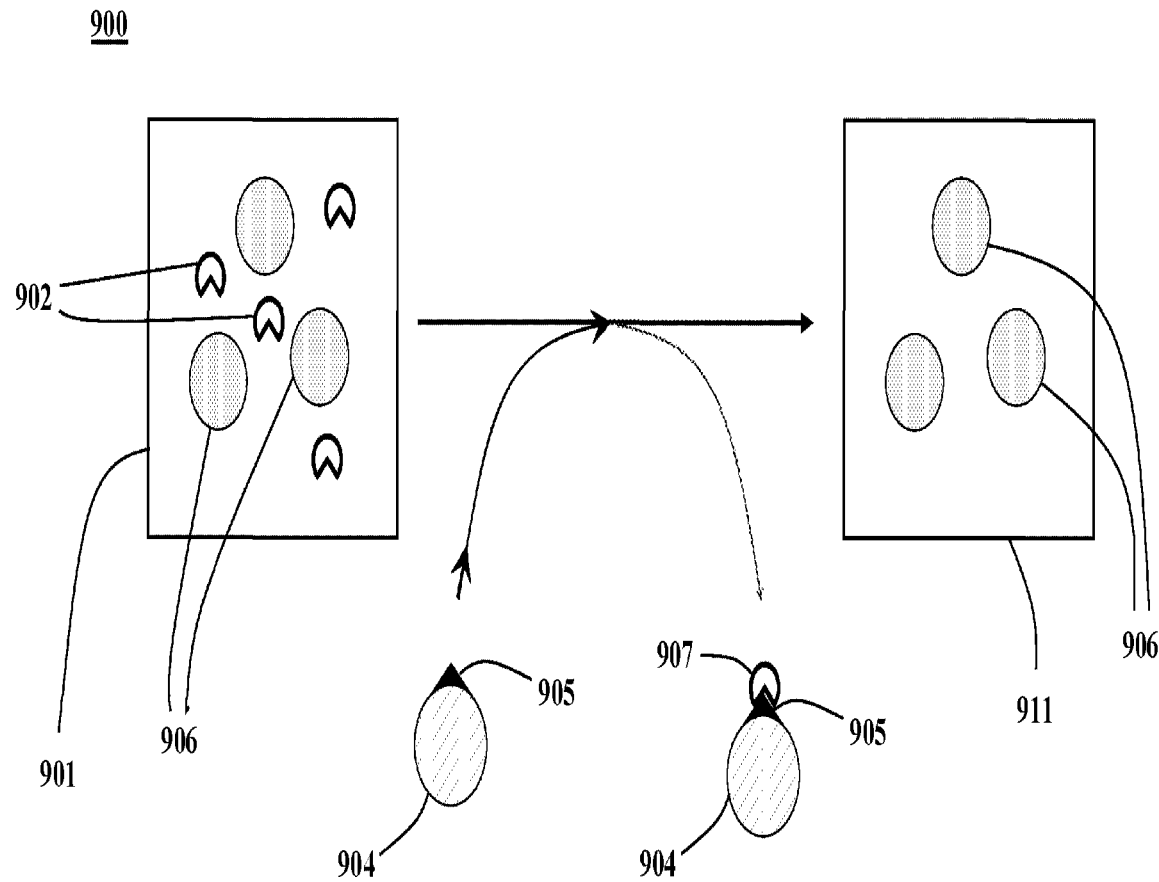
FIG. 9 shows another example method disclosed herein.

In some examples, a method disclosed herein is illustrated in FIG. 9. In the method 900, a system or sample 901 contains biological particles 906 and extracellular analytes 902. A support 904 that has an attached binding agent 905 that is capable of binding the analyte 902 is added to the sample 901, as shown by the incoming arrow. As already discussed, the binding agent 905 attached to the support 904 binds the analyte 902 to provide a bound analyte 907. The illustration shows removal of the support 904 attached to the binding agent 905 that has bound the analyte 907 (outgoing arrow). When the bound analyte 907 is removed, the remaining system or sample 911 contains the biological particles 906. The extracellular analytes 902 are no longer present in the system 911.

Use of Biological Particles in Partition-Based Sample Preparation and Assay Methods Biological particles that are analyzed using the methods of this disclosure may be used in partition-based sample preparation and assay methods. Generally, cell samples that, through the analysis, have shown to have an acceptably low amounts of extracellular analytes, including extracellular or free RNA in them are used in the partition-based methods.

In some instances, the method may further comprise compartmentalizing the sample into a partition or a plurality of partitions. The sample (e.g., a composition such as the processed sample) may be compartmentalized in a plurality of partitions and be subjected to further processing and analysis, such as sequencing (e.g., single cell sequencing in a plurality of droplets or a plurality of wells). Signal reads may be generated for intracellular as well as extracellular nucleic acid molecules that may be present in the sample. Recognized is a need (i) to distinguish the signals generated for the intracellular nucleic acid molecules or nucleic acid molecules inside cell nuclei from the extracellular nucleic acid molecules, or (ii) to partially, substantially, or completely eliminate the signals generated from the extracellular molecules. In some cases, the intracellular vs. extracellular signals may be distinguished using computational methods, systems, and/or tools. Alternatively, the method may comprise reducing the amount of extracellular nucleic acid molecules in a sample comprising a cell and/or cell nucleus that is to be subjected to analysis or removing them. In some cases, the extracellular nucleic acid molecules may be substantially removed or eliminated from a sample comprising cells and/or cell nuclei. The processed sample or composition may be further partitioned in a plurality of partitions after decreasing or substantially removing the extracellular molecules (e.g., extracellular nucleic acid molecules) in the sample.

In some instances, the compartmentalized processed sample or composition may be analyzed, for example by subjecting the processed sample or composition or an emulsion (e.g., plurality of droplets in a continuous phase) thereof to sequencing. Data (e.g., single cell data) may be generated for the cells and/or cell nuclei in the sample. Such data may be analyzed and clustered in a plurality of subpopulations and the characteristics of each subpopulation may be studied and/or defined.

The term "partition," as used herein, generally, refers to a space or volume that may be suitable to contain one or more species or conduct one or more reactions. A partition may be a physical compartment, such as a droplet or well (e.g., a microwell). The partition may isolate space or volume from another space or volume. The droplet may be a first phase (e.g., aqueous phase) in a second phase (e.g., oil) immiscible with the first phase. The droplet may be a first phase in a second phase that does not phase separate from the first phase, such as, for example, a capsule or liposome in an aqueous phase. A partition may comprise one or more other (inner) partitions. In some cases, a partition may be a virtual compartment that can be defined and identified by an index (e.g., indexed libraries) across multiple and/or remote physical compartments. For example, a physical compartment may comprise a plurality of virtual compartments.

Preparation of a partition containing a biological sample that is useful in a partition-based assay involves numerous steps (e.g., sample transport, tissue dissociation, liquid phase washing and transfer, library preparation) that typically take from a few hours to days One type of partition-based assay is a droplet-based assay. Such assays use a biological sample (e.g., cell) that is isolated and partitioned in a discrete droplet in an emulsion. The discrete droplet typically includes a unique identifier for the sample in the form of a unique oligonucleotide sequence also contained in the droplet. The discrete droplet can also contain the assay reagents that are used to generate detectable analytes (e.g., 3' cDNA sequences) from the sample and provide useful information about it (e.g., RNA transcript profile).

In at least one embodiment, the method further comprises generating a discrete droplet encapsulating a processed biological sample (e.g., single cell tested or analyzed by the methods described herein). In at least one embodiment, the method further comprises generating a discrete droplet encapsulating the processed biological sample. In at least one embodiment, the method further comprises generating a discrete droplet encapsulating a processed biological sample, one or more enzymes, one or more primers, templates and, optionally, a bead.

In at least one embodiment wherein the method comprises generating a discrete droplet, the discrete droplet further comprises assay reagents; optionally, wherein the assay reagents are contained in a bead. In at least one embodiment, the discrete droplet further comprises a barcode; optionally, wherein the barcode is contained in a bead. Methods and systems for partitioning barcode carrying beads into droplets are provided in US. Patent Publication Nos. 2019/0367997 and 2019/0064173, and International Application Nos. PCT/US20/17785 and PCT/US20/020486, each of which is herein entirely incorporated by reference for all purposes.

Figure 3:
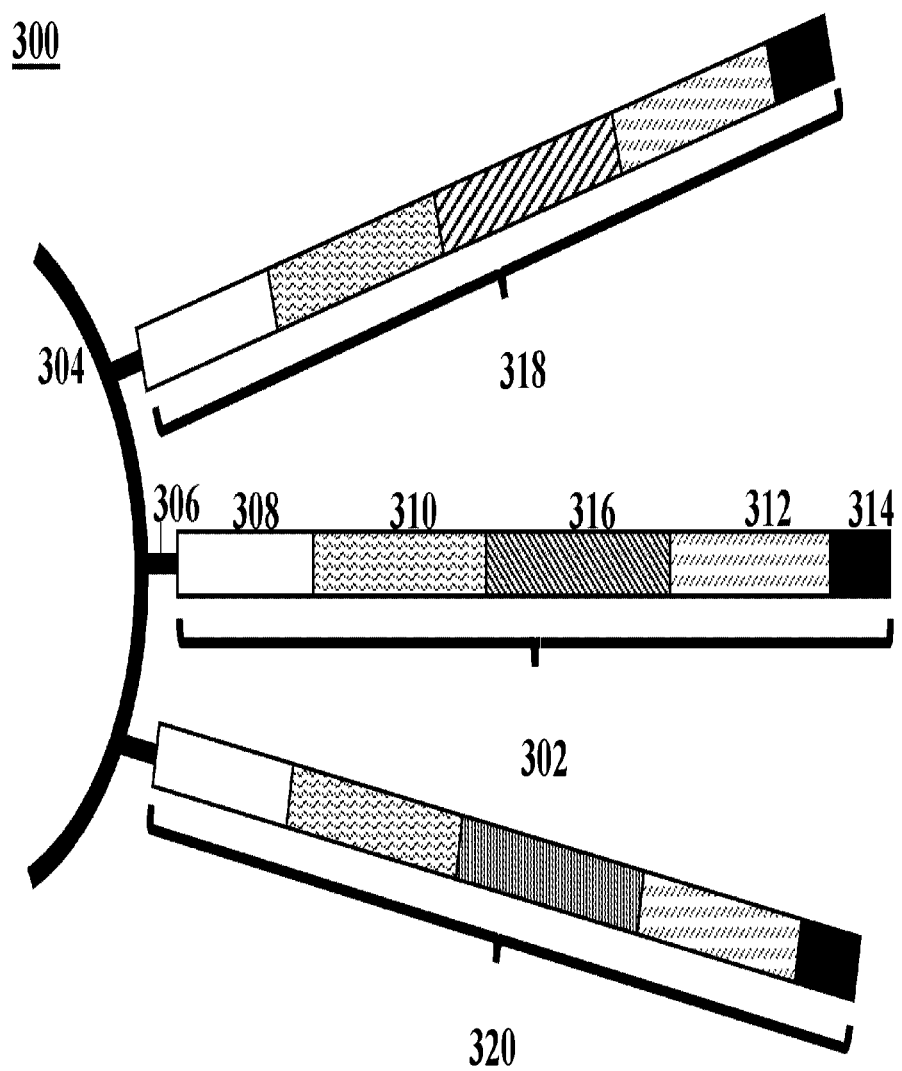
FIG. 3 shows an exemplary barcode carrying bead.

FIG. 3 illustrates an example of a barcode carrying bead 300. A nucleic acid molecule 302, such as an oligonucleotide, can be coupled to a bead 304 by a releasable linkage 306, such as, for example, a disulfide linker. The same bead 304 may be coupled (e.g., via releasable linkage) to one or more other nucleic acid molecules 318, 320. The nucleic acid molecule 302 may be or comprise a barcode. As noted elsewhere herein, the structure of the barcode may comprise a number of sequence elements. The nucleic acid molecule 302 may comprise a functional sequence 308 that may be used in subsequent processing. For example, the functional sequence 308 may include one or more of a sequencer specific flow cell attachment sequence (e.g., a P5 sequence for Illumina® sequencing systems) and a sequencing primer sequence (e.g., a R1 primer for Illumina® sequencing systems). The nucleic acid molecule 302 may comprise a barcode sequence 310 for use in barcoding the sample (e.g., DNA, RNA, protein, antibody, etc.). In some cases, the barcode sequence 310 can be bead-specific such that the barcode sequence 310 is common to all nucleic acid molecules (e.g., including nucleic acid molecule 302) coupled to the same bead 304. Alternatively, or in addition, the barcode sequence 310 can be partition-specific such that the barcode sequence 310 is common to all nucleic acid molecules coupled to one or more beads that are partitioned into the same partition. The nucleic acid molecule 302 may comprise a specific priming sequence 312, such as an mRNA specific priming sequence (e.g., poly-T sequence), a targeted priming sequence, and/or a random priming sequence. The nucleic acid molecule 302 may comprise an anchoring sequence 314 to ensure that the specific priming sequence 312 hybridizes at the sequence end (e.g., of the mRNA). For example, the anchoring sequence 314 can include a random short sequence of nucleotides, such as a 1-mer, 2-mer, 3-mer or longer sequence, which can ensure that a poly-T segment is more likely to hybridize at the sequence end of the poly-A tail of the mRNA.

The nucleic acid molecule 302 may comprise a unique molecular identifying sequence 316 (e.g., unique molecular identifier (UMI)). In some cases, the unique molecular identifying sequence 316 may comprise from about 5 to about 8 nucleotides. Alternatively, the unique molecular identifying sequence 316 may compress less than about 5 or more than about 8 nucleotides. The unique molecular identifying sequence 316 may be a unique sequence that varies across individual nucleic acid molecules (e.g., 302, 318, 320, etc.) coupled to a single bead (e.g., bead 304). In some cases, the unique molecular identifying sequence 316 may be a random sequence (e.g., such as a random N-mer sequence). For example, the UMI may provide a unique identifier of the starting mRNA molecule that was captured, in order to allow quantitation of the number of original expressed RNA. As will be appreciated, although FIG. 3 shows three nucleic acid molecules 302, 318, 320 coupled to the surface of the bead 304, an individual bead may be coupled to any number of individual nucleic acid molecules, for example, from one to tens to hundreds of thousands or even millions of individual nucleic acid molecules. The respective barcodes for the individual nucleic acid molecules can comprise both common sequence segments or relatively common sequence segments (e.g., 308, 310, 312, etc.) and variable or unique sequence segments (e.g., 316) between different individual nucleic acid molecules coupled to the same bead.

A biological particle (e.g., cell, DNA, RNA, etc.) can be co-partitioned along with a barcode bearing bead 304. The barcoded nucleic acid molecules 302, 318, 320 can be released from the bead 304 in the partition. By way of example, in the context of analyzing sample RNA, the poly-T segment (e.g., 312) of one of the released nucleic acid molecules (e.g., 302) can hybridize to the poly-A tail of a mRNA molecule. Reverse transcription may result in a cDNA transcript of the mRNA, but which transcript includes each of the sequence segments 308, 310, 316 of the nucleic acid molecule 302. Because the nucleic acid molecule 302 comprises an anchoring sequence 314, it will more likely hybridize to and prime reverse transcription at the sequence end of the poly-A tail of the mRNA. Within any given partition, all of the cDNA transcripts of the individual mRNA molecules may include a common barcode sequence segment 310.

However, the transcripts made from the different mRNA molecules within a given partition may vary at the unique molecular identifying sequence 316 segment (e.g., UMI segment). Beneficially, even following any subsequent amplification of the contents of a given partition, the number of different UMIs can be indicative of the quantity of mRNA originating from a given partition, and thus from the biological particle (e.g., cell). As noted above, the transcripts can be amplified, cleaned up and sequenced to identify the sequence of the cDNA transcript of the mRNA, as well as to sequence the barcode segment and the UMI segment. While a poly-T primer sequence is described, other targeted or random priming sequences may also be used in priming the reverse transcription reaction. Likewise, although described as releasing the barcoded oligonucleotides into the partition, in some cases, the nucleic acid molecules bound to the bead (e.g., gel bead) may be used to hybridize and capture the mRNA on the solid phase of the bead, for example, in order to facilitate the separation of the RNA from other cell contents. In such cases, further processing may be performed, in the partitions or outside the partitions (e.g., in bulk). For instance, the RNA molecules on the beads may be subjected to reverse transcription or other nucleic acid processing, additional adapter sequences may be added to the barcoded nucleic acid molecules, or other nucleic acid reactions (e.g., amplification, nucleic acid extension) may be performed. The beads or products thereof (e.g., barcoded nucleic acid molecules) may be collected from the partitions, and/or pooled together and subsequently subjected to clean up and further characterization (e.g., sequencing). The operations described herein may be performed at any useful or convenient step. For instance, the beads comprising nucleic acid barcode molecules may be introduced into a partition (e.g., well or droplet) prior to, during, or following introduction of a sample into the partition. The nucleic acid molecules of a sample may be subjected to barcoding, which may occur on the bead (in cases where the nucleic acid molecules remain coupled to the bead) or following release of the nucleic acid barcode molecules into the partition. In cases where the nucleic acid molecules from the sample remain attached to the bead, the beads from various partitions may be collected, pooled, and subjected to further processing (e.g., reverse transcription, adapter attachment, amplification, clean up, sequencing). In other instances, the processing may occur in the partition. For example, conditions sufficient for barcoding, adapter attachment, reverse transcription, or other nucleic acid processing operations may be provided in the partition and performed prior to clean up and sequencing.

Figure 4:
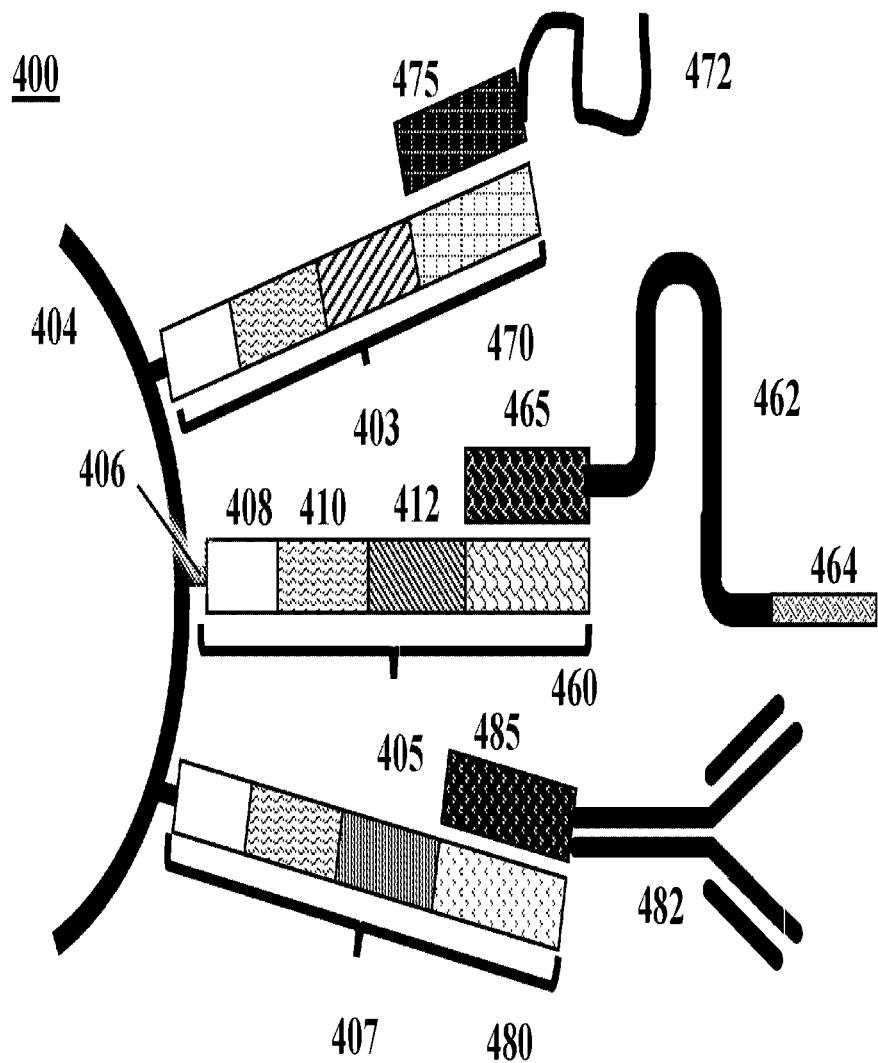
FIG. 4 shows another exemplary barcode carrying bead.

FIG. 4 illustrates another example of a barcode carrying bead 400. A nucleic acid molecule 405, such as an oligonucleotide, can be coupled to a bead 404 by a releasable linkage 406, such as, for example, a disulfide linker. The nucleic acid molecule 405 may comprise a first capture sequence 460. The same bead 404 may be coupled (e.g., via releasable linkage) to one or more other nucleic acid molecules 403, 407 comprising other capture sequences. The nucleic acid molecule 405 may be or comprise a barcode. As noted elsewhere herein, the structure of the barcode may comprise a number of sequence elements, such as a functional sequence 408 (e.g., flow cell attachment sequence, sequencing primer sequence, etc.), a barcode sequence 410 (e.g., bead-specific sequence common to bead, partition-specific sequence common to partition, etc.), and a unique molecular identifier 412 (e.g., unique sequence within different molecules attached to the bead), or partial sequences thereof. The capture sequence 460 may be configured to attach to a corresponding capture sequence 465. In some instances, the corresponding capture sequence 465 may be coupled to another molecule that may be an analyte or an intermediary carrier. For example, as illustrated in FIG. 4, the corresponding capture sequence 465 is coupled to a guide RNA molecule 462 comprising a target sequence 464, wherein the target sequence 464 is configured to attach to the analyte. Another oligonucleotide molecule 407 attached to the bead 404 comprises a second capture sequence 480 which is configured to attach to a second corresponding capture sequence 485. As illustrated in FIG. 4, the second corresponding capture sequence 485 is coupled to an antibody 482. In some cases, the antibody 482 may have binding specificity to an analyte (e.g., surface protein). Alternatively, the antibody 482 may not have binding specificity. Another oligonucleotide molecule 403 attached to the bead 404 comprises a third capture sequence 470 which is configured to attach to a second corresponding capture sequence 475. As illustrated in FIG. 4, the third corresponding capture sequence 475 is coupled to a molecule 472. The molecule 472 may or may not be configured to target an analyte. The other oligonucleotide molecules 403, 407 may comprise the other sequences (e.g., functional sequence, barcode sequence, UMI, etc.) described with respect to oligonucleotide molecule 405. While a single oligonucleotide molecule comprising each capture sequence is illustrated in FIG. 4, it will be appreciated that, for each capture sequence, the bead may comprise a set of one or more oligonucleotide molecules each comprising the capture sequence. For example, the bead may comprise any number of sets of one or more different capture sequences. Alternatively, or in addition, the bead 404 may comprise other capture sequences. Alternatively, or in addition, the bead 404 may comprise fewer types of capture sequences (e.g., two capture sequences). Alternatively or in addition, the bead 404 may comprise oligonucleotide molecule(s) comprising a priming sequence, such as a specific priming sequence such as an mRNA specific priming sequence (e.g., poly-T sequence), a targeted priming sequence, and/or a random priming sequence, for example, to facilitate an assay for gene expression.

Methods, techniques, and protocols useful for partitioning biological samples (e.g., individual cells, biomolecular contents of cells, etc.) into discrete droplets are known and well described in the art. The discrete droplets generated may be in a nanoliter-scale container that can maintain separation the droplet contents from the contents of other droplets in the emulsion. Methods and systems for creating stable discrete droplets encapsulating individual particles from biological samples in non-aqueous or oil emulsions are described in, e.g., U.S. Patent Application Publication Nos. 2010/0105112 and 2019/0100632, each of which is entirely incorporated herein by reference for all purposes. Briefly, discrete droplets in an emulsion encapsulating a biological sample is accomplished by introducing a flowing stream of an aqueous fluid containing the biological sample into a flowing stream of a non-aqueous fluid with which it is immiscible, such that droplets are generated at the junction of the two streams (see FIGS. 1 and 2). By providing the aqueous stream at a certain concentration and/or flow rate of the biological sample, the occupancy of the resulting droplets can be controlled. For example, the relative flow rates of the immiscible fluids can be selected such that, on average, the discrete droplet each contains less than one biological particle. Such a flow rate ensures that the droplets that are occupied are primarily occupied by a single sample (e.g., a single cell). Discrete droplets in an emulsion encapsulating a biological sample is also accomplished using a microfluidic architecture comprising a channel segment having a channel junction with a reservoir.

In some cases, the droplets among a plurality of discrete droplets formed contain at most one particle (e.g., one bead, one cell). The flows and microfluidic channel architectures also can be controlled to ensure a given number of singly occupied droplets, less than a certain level of unoccupied droplets, and/or less than a certain level of multiply occupied droplets.

In another aspect of the disclosure, processed biological particles may then be partitioned (e.g., in a droplet or well) with other reagents for processing of one or more analytes as described herein. In one embodiment, the processed biological particle may be partitioned with a support (e.g., a bead) comprising nucleic acid molecules suitable for barcoding of the one or more analytes. In another embodiment, the nucleic acid molecules may include nucleic acid sequences that provide identifying information, e.g., barcode sequence(s).

The term "bead," as used herein, generally refers to a particle. The bead may be a solid or semi-solid particle. The bead may be a gel bead. The gel bead may include a polymer matrix (e.g., matrix formed by polymerization or crosslinking). The polymer matrix may include one or more polymers (e.g., polymers having different functional groups or repeat units). Polymers in the polymer matrix may be randomly arranged, such as in random copolymers, and/or have ordered structures, such as in block copolymers. Cross-linking can be via covalent, ionic, or inductive, interactions, or physical entanglement. The bead may be a macromolecule. The bead may be formed of nucleic acid molecules bound together. The bead may be formed via covalent or non-covalent assembly of molecules (e.g., macromolecules), such as monomers or polymers. Such polymers or monomers may be natural or synthetic. Such polymers or monomers may be or include, for example, nucleic acid molecules (e.g., DNA or RNA). The bead may be formed of a polymeric material. The bead may be magnetic or non-magnetic. The bead may be rigid. The bead may be flexible and/or compressible. The bead may be disruptable or dissolvable. The bead may be a solid particle (e.g., a metal-based particle including but not limited to iron oxide, gold or silver) covered with a coating comprising one or more polymers. Such coating may be disruptable or dissolvable.

FIG. 1 shows an exemplary microfluidic channel structure 100 useful for generating discrete droplets encapsulating a particle from a biological sample, such as a single cell. The channel structure 100 can include channel segments 102, 104, 106 and 108 communicating at a channel junction 110. In operation, a first aqueous fluid 112 that that includes suspended particles (e.g., cells) from a biological sample 114 are transported along channel segment 102 into junction 110, while a second fluid 116 (or "partitioning fluid") that is immiscible with the aqueous fluid 112 is delivered to the junction 110 from each of channel segments 104 and 106 to create discrete droplets 118, 120 of the first aqueous fluid 112 flowing into channel segment 108, and flowing away from junction 110. The channel segment 108 may be fluidically coupled to an outlet reservoir where the discrete droplets can be stored and/or harvested. A discrete droplet generated may include an individual particle from a biological sample 114 (such as droplet 118), or discrete droplet can be generated that includes more than one particle 114 (not shown in FIG. 1). A discrete droplet may contain no biological particle 114 (such as droplet 120). Each discrete droplet is capable of maintaining separation of its own contents (e.g., individual biological sample particle 114) from the contents of other droplets.

Typically, the second fluid 116 comprises an oil, such as a fluorinated oil, that includes a fluoro-surfactant that helps to stabilize the resulting droplets. Examples of useful partitioning fluids and fluoro-surfactants are described in e.g., U.S. Patent Application Publication No. 2010/0105112, which is entirely incorporated herein by reference for all purposes.

The microfluidic channels for generating discrete droplets as exemplified in FIG. 1 may be coupled to any of a variety of different fluid sources or receiving components, including reservoirs, tubing, manifolds, or fluidic components of other systems. Additionally, the microfluidic channel structure 100 may have other geometries, including geometries having more than one channel junction. For example, the microfluidic channel structure can have 2, 3, 4, or 5 channel segments each carrying biological sample particles, assay reagents, and/or beads that meet at a channel junction.

Generally, the fluids used in generating the discrete droplets are directed to flow along one or more channels or reservoirs via one or more fluid flow units. A fluid flow unit can comprise compressors (e.g., providing positive pressure), pumps (e.g., providing negative pressure), actuators, and the like to control flow of the fluid. Fluid may also or otherwise be controlled via applied pressure differentials, centrifugal force, electro-kinetic pumping, vacuum, capillary or gravity flow, or the like.

One of ordinary skill will recognize that numerous different microfluidic channel designs are available that can be used with the methods of the present disclosure to provide discrete droplets containing a biological sample particle, an enzyme composition, and/or a bead with a barcode and/or other assay reagents.

The inclusion of a barcode in a discrete droplet along with the biological sample provides a unique identifier that allows data from the biological sample to be distinguished and individually analyzed. Barcodes can be delivered previous to, subsequent to, or concurrent with the biological sample in discrete droplet. For example, barcodes may be injected into droplets previous to, subsequent to, or concurrently with droplet generation. Barcodes useful in the methods of the present disclosure typically comprise a nucleic acid molecule (e.g., an oligonucleotide). The nucleic acid barcode molecules typically are delivered to a partition via a microcapsule, such as bead. In some cases, barcode nucleic acid molecules are initially associated with the bead upon generation of the discrete droplet, and then released from the bead upon application of a stimulus to droplet. Barcode carrying beads useful in the methods of the present disclosure are described in further detail elsewhere herein.

Figure 2:
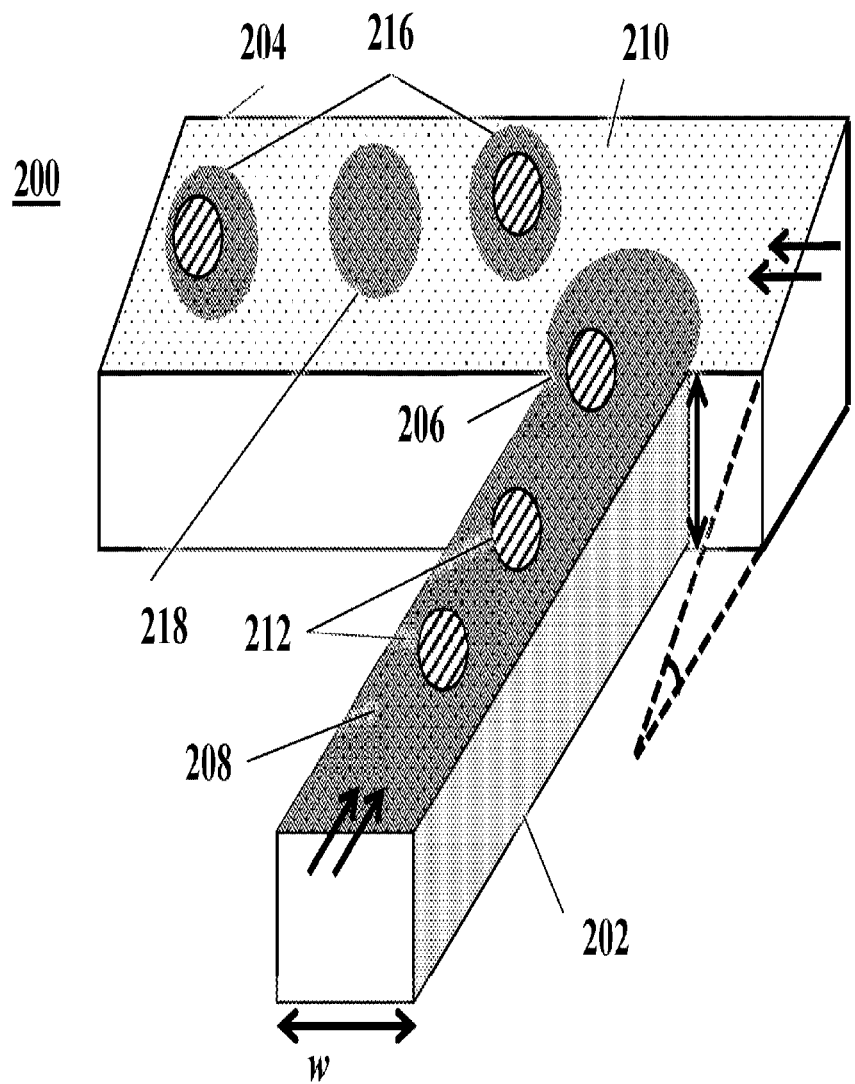
FIG. 2 shows an example of a microfluidic channel structure for the controlled partitioning of beads into discrete droplets.

Using such a channel system as exemplified in FIG. 1 or FIG. 2, discrete droplets can be generated that encapsulate an individual particle of a biological sample, and one bead, wherein the bead can carry a barcode and/or another reagent. It is also contemplated, that in some instances, a discrete droplet may be generated using the channel system of FIG. 1 or FIG. 2, wherein droplet includes more than one individual biological sample particle or includes no biological sample. Similarly, in some embodiments, the discrete droplet may include more than one bead or no bead. A discrete droplet also may be completely unoccupied (e.g., no bead or biological sample).

In some embodiments, it is desired that the beads, biological sample particles, and generated discrete droplets flow along channels at substantially regular flow rates that generate a discrete droplet containing a single bead and a single biological sample particle. Regular flow rates and devices that may be used to provide such regular flow rates are known in the art, see e.g., U.S. Patent Publication No. 2015/0292988, which is hereby incorporated by reference herein in its entirety. In some embodiments, the flow rates are set to provide discrete droplets containing a single bead and a biological sample particle with a yield rate of greater than 5%, 10%, 20%, 30%, 40%, 50%, 60%, 70%, 80%, 90%, or 95%.

Beads that can carry barcodes and/or other reagents that are useful with the methods of the present disclosure can include beads that are porous, non-porous, solid, semi-solid, semi-fluidic, fluidic, and/or a combination thereof. In some embodiments, the bead can be made of a material that is dissolvable, disruptable, and/or degradable, such as a gel bead comprising a hydrogel. Alternatively, in some embodiments, the bead is not degradable.

In some embodiments of the present disclosure, the bead encapsulated in a discrete droplet with a biological sample is a bead. Typically, the bead useful in the embodiments disclosed herein comprise a hydrogel. Such gel beads can be formed from molecular precursors, such as a polymeric or monomeric species, that undergo a reaction to form cross-linked gel polymer. Another semi-solid bead useful in the present disclosure is a liposomal bead. In some embodiments, beads used can be solid beads that comprise a metal including iron oxide, gold, and silver. In some cases, the bead may be a silica bead. In some cases, the bead can be rigid. In other cases, the bead may be flexible and/or compressible. Generally, the beads can be of any suitable shape. Examples of bead shapes include, but are not limited to, spherical, non-spherical, oval, oblong, amorphous, circular, cylindrical, and variations thereof.

The plurality beads used in the embodiments can be of uniform size or they can comprise a collection of heterogeneous sizes. In some cases, the diameter of a bead is at least about 1 micron (μm), 5 μm, 10 μm, 20 μm, 30 μm, 40 μm, 50 μm, 60 μm, 70 μm, 80 μm, 90 μm, 100 μm, 250 μm, 500 μm, 1000 μm (1 mm), or greater. In some cases, a bead may have a diameter of less than about 1 μm, 5 μm, 10 μm, 20 μm, 30 μm, 40 μm, 50 μm, 60 μm, 70 μm, 80 μm, 90 μm, 100 μm, 250 μm, 500 μm, 1 mm, or less. In some cases, a bead may have a diameter in the range of about 40-75 μm, 30-75 μm, 20-75 μm, 40-85 μm, 40-9 5 μm, 20-100 μm, 10-100 μm, 1-100 μm, 20-250 μm, or 20-500 μm.

In some embodiments, the beads used are a population or plurality of beads having a relatively monodisperse size distribution. Typically, where it is desirable to provide a consistent amount of a reagent within a discrete droplet, the use of relatively consistent bead characteristics, such as size, provides overall consistency in the content of each droplet. For example, the beads useful in the embodiments of the present disclosure can have size distributions that have a coefficient of variation in their cross-sectional dimensions of less than 50%, less than 40%, less than 30%, less than 20%, and in some cases less than 15%, less than 10%, less than 5%, or less.

The beads useful in the methods of the present disclosure can comprise a range of natural and/or synthetic materials. For example, a bead can comprise a natural polymer, a synthetic polymer or both natural and synthetic polymers. Examples of natural polymers include proteins and sugars such as deoxyribonucleic acid, rubber, cellulose, starch (e.g., amylose, amylopectin), proteins, enzymes, polysaccharides, silks, polyhydroxyalkanoates, chitosan, dextran, collagen, carrageenan, ispaghula, acacia, agar, gelatin, shellac, sterculia gum, xanthan gum, corn sugar gum, guar gum, gum karaya, agarose, alginic acid, alginate, or natural polymers thereof. Examples of synthetic polymers include acrylics, nylons, silicones, spandex, viscose rayon, polycarboxylic acids, polyvinyl acetate, polyacrylamide, polyacrylate, polyethylene glycol, polyurethanes, polylactic acid, silica, polystyrene, polyacrylonitrile, polybutadiene, polycarbonate, polyethylene, polyethylene terephthalate, poly(chlorotrifluoroethylene), poly(ethylene oxide), poly(ethylene terephthalate), polyethylene, polyisobutylene, poly(methyl methacrylate), poly(oxymethylene), polyformaldehyde, polypropylene, polystyrene, poly(tetrafluoroethylene), poly (vinyl acetate), poly(vinyl alcohol), poly(vinyl chloride), poly(vinylidene dichloride), poly(vinylidene difluoride), poly(vinyl fluoride) and/or combinations (e.g., co-polymers) thereof. Beads may also be formed from materials other than polymers, including lipids, micelles, ceramics, glass-ceramics, material composites, metals, other inorganic materials, and others.

Although FIG. 1 and FIG. 2 have been described in terms of providing substantially singly occupied discrete droplets, it is also contemplated in certain embodiments that it is desirable to provide multiply occupied discrete droplets, e.g., a single droplet that contains two, three, four or more cells from a biological sample, and/or multiple different beads, such as a bead carrying a barcode nucleic acid molecule and/or a microcapsule bead carrying a reagent. Accordingly, as noted elsewhere herein, the flow characteristics of the biological particle and/or the beads can be controlled to provide for such multiply occupied droplets. In particular, the flow parameters of the liquids used in the channel structures may be controlled to provide a given droplet occupancy rate greater than about 50%, greater than about 75%, and in some cases greater than about 80%, 90%, 95%, or higher.

In some embodiments, the beads useful in the methods of the present disclosure are microcapsules capable of delivering reagents into the discrete droplet generated containing the biological sample particle. In some embodiments, the different beads (e.g., containing different reagents) can be introduced from different sources into different inlets leading to a common droplet generation junction. In such cases, the flow and frequency of the different beads into the channel or junction may be controlled to provide for a certain ratio of microcapsule beads from each source, while ensuring a given pairing or combination of such beads into a partition with a given number of biological particles (e.g., one biological particle and one bead per partition).

The discrete droplets described herein generally comprise small volumes, for example, less than about 10 microliters (μL), 5 μL, 1 μL, 900 picoliters (pL), 800 μL, 700 pL, 600 μL, 500 pL, 400 pL, 300 pL, 200 pL, 100 pL, 50 pL, 20 pL, 10 μL, 1 pL, 500 nanoliters (nL), 100 nL, 50 nL, or less. In some embodiments, the discrete droplets generated that encapsulate a biological sample particle have overall volumes that are less than about 1000 pL, 900 pL, 800 pL, 700 pL, 600 pL, 500 pL, 400 pL, 300 pL, 200 pL, 100 pL, 50 pL, 20 pL, 10 pL, 1 pL, or less. It will be appreciated that the sample fluid volume, e.g., including co-partitioned biological particles and/or beads, within the droplets may be less than about 90% of the above described volumes, less than about 80%, less than about 70%, less than about 60%, less than about 50%, less than about 40%, less than about 30%, less than about 20%, or less than about 10% of the above described volumes.

The methods of generating discrete droplets useful with the methods of the present disclosure, result in the generation of a population or plurality of discrete droplets containing a biological sample particle and other reagents. Generally, the methods are easily controlled to provide for any suitable number of droplets. For example, at least about 1,000 discrete droplets, at least about 5,000 discrete droplets, at least about 10,000 discrete droplets, at least about 50,000 discrete droplets, at least about 100,000 discrete droplets, at least about 500,000 discrete droplets, at least about 1,000,000 discrete droplets, at least about 5,000,000 discrete droplets, at least about 10,000,000 discrete droplets, or more discrete droplets can be generated or otherwise provided. Moreover, the plurality of discrete droplets may comprise both unoccupied and occupied droplets.

As described elsewhere herein, in some embodiments of the methods of the present disclosure, the generated discrete droplets encapsulating a biological sample particle, and optionally, one or more different beads, also contain other reagents. In some embodiments, the other reagents encapsulated in the droplet include lysis agents that act to release the biomolecule contents of the biological sample particle within the droplet. In some embodiments, the lysis agents can be contacted with the biological sample suspension concurrently with, or immediately prior to, the introduction of the biological sample particles into the droplet generation junction of the microfluidic system. In some embodiments, the agents are introduced through an additional channel or channels upstream of the channel junction.

In some embodiments, a biological sample particle can be co-partitioned along with the other reagents. Generally, the channel segments described herein may be coupled to any of a variety of different fluid sources or receiving components, including reservoirs, tubing, manifolds, or fluidic components of other systems. As will be appreciated, the microfluidic channel structures may have other geometries and/or configurations. For example, a microfluidic channel structure can have more than two channel junctions. For example, a microfluidic channel structure can have 2, 3, 4, 5 channel segments or more each carrying the same or different types of beads, reagents, and/or biological sample particles that meet at a channel junction. Fluid flow in each channel segment may be controlled to control the partitioning of the different elements into droplets. Fluid may be directed flow along one or more channels or reservoirs via one or more fluid flow units. A fluid flow unit can comprise compressors (e.g., providing positive pressure), pumps (e.g., providing negative pressure), actuators, and the like to control flow of the fluid. Fluid may also or otherwise be controlled via applied pressure differentials, centrifugal force, electro-kinetic pumping, vacuum, capillary or gravity flow, or the like.

FIG. 2 shows an example of a microfluidic channel structure for the controlled partitioning of beads into discrete droplets 200. A channel structure 200 can include a channel segment 202 communicating at a channel junction 206 (or intersection) with a reservoir 204. The reservoir 204 can be a chamber. Any reference to "reservoir," as used herein, can also refer to a "chamber." In operation, an aqueous fluid 208 that includes suspended beads 212 may be transported along the channel segment 202 into the junction 206 to meet a second fluid 210 that is immiscible with the aqueous fluid 208 in the reservoir 204 to create droplets 216, 218 of the aqueous fluid 208 flowing into the reservoir 204. At the junction 206 where the aqueous fluid 208 and the second fluid 210 meet, droplets can form based on factors such as the hydrodynamic forces at the junction 206, flow rates of the two fluids 208, 210, fluid properties, and certain geometric parameters (e.g., w, h0, α, etc.) of the channel structure 200. A plurality of droplets can be collected in the reservoir 204 by continuously injecting the aqueous fluid 208 from the channel segment 202 through the junction 206.

Figure 5:
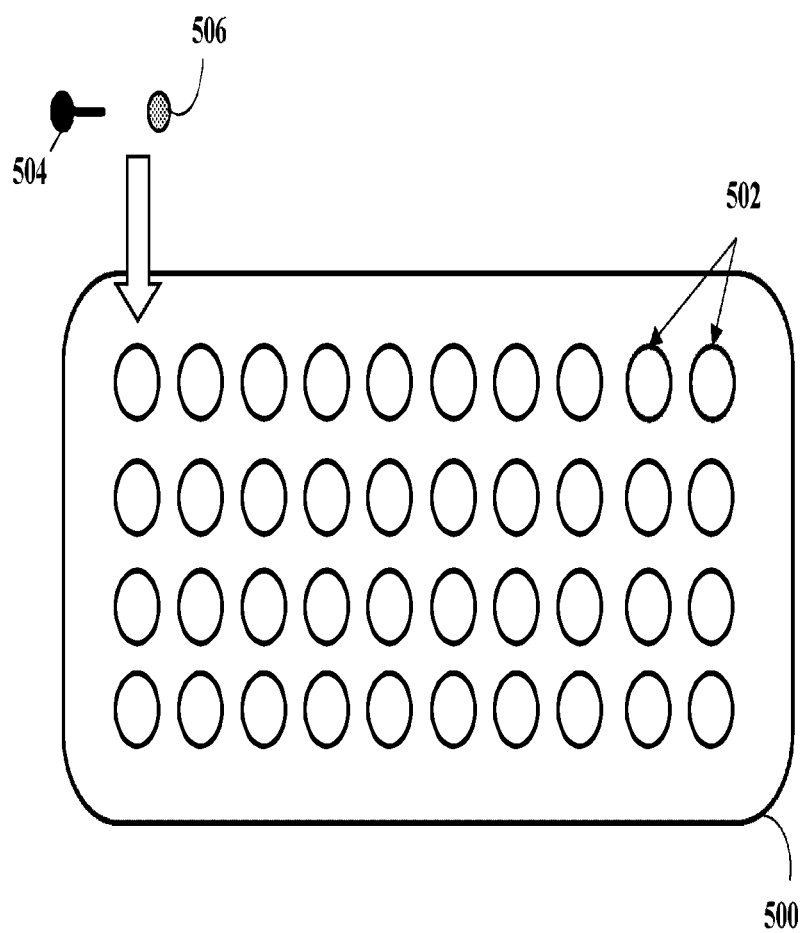
FIG. 5 shows an exemplary microwell array schematic.

FIG. 5 schematically illustrates an example of a microwell array. The array can be contained within a substrate 500. The substrate 500 comprises a plurality of wells 502. The wells 502 may be of any size or shape, and the spacing between the wells, the number of wells per substrate, as well as the density of the wells on the substrate 500 can be modified, depending on the particular application. In one such example application, a sample molecule 506, which may comprise a cell or cellular components (e.g., nucleic acid molecules) is co-partitioned with a bead 504, which may comprise a nucleic acid barcode molecule coupled thereto. The wells 502 may be loaded using gravity or other loading technique (e.g., centrifugation, liquid handler, acoustic loading, optoelectronic, etc.). In some instances, at least one of the wells 502 contains a single sample molecule 506 (e.g., cell) and a single bead 504.

Reagents may be loaded into a well either sequentially or concurrently. In some cases, reagents are introduced to the device either before or after a particular operation. In some cases, reagents (which may be provided, in certain instances, in microcapsules, droplets, or beads) are introduced sequentially such that different reactions or operations occur at different steps. The reagents (or microcapsules, droplets, or beads) may also be loaded at operations interspersed with a reaction or operation step. For example, microcapsules (or droplets or beads) comprising reagents for fragmenting polynucleotides (e.g., restriction enzymes) and/or other enzymes (e.g., transposases, ligases, polymerases, etc.) may be loaded into the well or plurality of wells, followed by loading of microcapsules, droplets, or beads comprising reagents for attaching nucleic acid barcode molecules to a sample nucleic acid molecule. Reagents may be provided concurrently or sequentially with a sample, e.g., a cell or cellular components (e.g., organelles, proteins, nucleic acid molecules, carbohydrates, lipids, etc.). Accordingly, use of wells may be useful in performing multi-step operations or reactions.

As described elsewhere herein, the nucleic acid barcode molecules and other reagents may be contained within a microcapsule, bead, or droplet. These microcapsules, beads, or droplets may be loaded into a partition (e.g., a microwell) before, after, or concurrently with the loading of a cell, such that each cell is contacted with a different microcapsule, bead, or droplet. This technique may be used to attach a unique nucleic acid barcode molecule to nucleic acid molecules obtained from each cell. Alternatively, or in addition to, the sample nucleic acid molecules may be attached to a support. For instance, the partition (e.g., microwell) may comprise a bead which has coupled thereto a plurality of nucleic acid barcode molecules. The sample nucleic acid molecules, or derivatives thereof, may couple or attach to the nucleic acid barcode molecules on the support. The resulting barcoded nucleic acid molecules may then be removed from the partition, and in some instances, pooled and sequenced. In such cases, the nucleic acid barcode sequences may be used to trace the origin of the sample nucleic acid molecule. For example, polynucleotides with identical barcodes may be determined to originate from the same cell or partition, while polynucleotides with different barcodes may be determined to originate from different cells or partitions.

The samples or reagents may be loaded in the wells or microwells using a variety of approaches. The samples (e.g., a cell, cell bead, or cellular component) or reagents (as described herein) may be loaded into the well or microwell using an external force, e.g., gravitational force, electrical force, magnetic force, or using mechanisms to drive the sample or reagents into the well, e.g., via pressure-driven flow, centrifugation, optoelectronics, acoustic loading, electrokinetic pumping, vacuum, capillary flow, etc. In certain cases, a fluid handling system may be used to load the samples or reagents into the well. The loading of the samples or reagents may follow a Poissonian distribution or a non-Poissonian distribution, e.g., super Poisson or sub-Poisson. The geometry, spacing between wells, density, and size of the microwells may be modified to accommodate a useful sample or reagent distribution; for instance, the size and spacing of the microwells may be adjusted such that the sample or reagents may be distributed in a super-Poissonian fashion.

In one particular non-limiting example, the microwell array or plate comprises pairs of microwells, in which each pair of microwells is configured to hold a droplet (e.g., comprising a single cell) and a single bead (such as those described herein, which may, in some instances, also be encapsulated in a droplet). The droplet and the bead (or droplet containing the bead) may be loaded simultaneously or sequentially, and the droplet and the bead may be merged, e.g., upon contact of the droplet and the bead, or upon application of a stimulus (e.g., external force, agitation, heat, light, magnetic or electric force, etc.). In some cases, the loading of the droplet and the bead is super-Poissonian. In other examples of pairs of microwells, the wells are configured to hold two droplets comprising different reagents and/or samples, which are merged upon contact or upon application of a stimulus. In such instances, the droplet of one microwell of the pair can comprise reagents that may react with an agent in the droplet of the other microwell of the pair. For instance, one droplet can comprise reagents that are configured to release the nucleic acid barcode molecules of a bead contained in another droplet, located in the adjacent microwell. Upon merging of the droplets, the nucleic acid barcode molecules may be released from the bead into the partition (e.g., the microwell or microwell pair that are in contact), and further processing may be performed (e.g., barcoding, nucleic acid reactions, etc.). In cases where intact or live cells are loaded in the microwells, one of the droplets may comprise lysis reagents for lysing the cell upon droplet merging.

A droplet or microcapsule may be partitioned into a well. The droplets may be selected or subjected to pre-processing prior to loading into a well. For instance, the droplets may comprise cells, and only certain droplets, such as those containing a single cell (or at least one cell), may be selected for use in loading of the wells. Such a pre-selection process may be useful in efficient loading of single cells, such as to obtain a non-Poissonian distribution, or to pre-filter cells for a selected characteristic prior to further partitioning in the wells. Additionally, the technique may be useful in obtaining or preventing cell doublet or multiplet formation prior to or during loading of the microwell.

In some instances, the wells can comprise nucleic acid barcode molecules attached thereto. The nucleic acid barcode molecules may be attached to a surface of the well (e.g., a wall of the well). The nucleic acid barcode molecule (e.g., a partition barcode sequence) of one well may differ from the nucleic acid barcode molecule of another well, which can permit identification of the contents contained with a single partition or well. In some cases, the nucleic acid barcode molecule can comprise a spatial barcode sequence that can identify a spatial coordinate of a well, such as within the well array or well plate. In some cases, the nucleic acid barcode molecule can comprise a unique molecular identifier for individual molecule identification. In some instances, the nucleic acid barcode molecules may be configured to attach to or capture a nucleic acid molecule within a sample or cell distributed in the well. For example, the nucleic acid barcode molecules may comprise a capture sequence that may be used to capture or hybridize to a nucleic acid molecule (e.g., RNA, DNA) within the sample. In some instances, the nucleic acid barcode molecules may be releasable from the microwell. For instance, the nucleic acid barcode molecules may comprise a chemical cross-linker which may be cleaved upon application of a stimulus (e.g., photo-, magnetic, chemical, biological, stimulus). The released nucleic acid barcode molecules, which may be hybridized or configured to hybridize to a sample nucleic acid molecule, may be collected and pooled for further processing, which can include nucleic acid processing (e.g., amplification, extension, reverse transcription, etc.) and/or characterization (e.g., sequencing). In such cases, the unique partition barcode sequences may be used to identify the cell or partition from which a nucleic acid molecule originated.

Characterization of samples within a well may be performed. Such characterization can include, in non-limiting examples, imaging of the sample (e.g., cell, cell bead, or cellular components) or derivatives thereof. Characterization techniques such as microscopy or imaging may be useful in measuring sample profiles in fixed spatial locations. For instance, when cells are partitioned, optionally with beads, imaging of each microwell and the contents contained therein may provide useful information on cell doublet formation (e.g., frequency, spatial locations, etc.), cell-bead pair efficiency, cell viability, cell size, cell morphology, expression level of a biomarker (e.g., a surface marker, a fluorescently labeled molecule therein, etc.), cell or bead loading rate, number of cell-bead pairs, etc. In some instances, imaging may be used to characterize live cells in the wells, including, but not limited to: dynamic live-cell tracking, cell-cell interactions (when two or more cells are co-partitioned), cell proliferation, etc. Alternatively, or in addition to, imaging may be used to characterize a quantity of amplification products in the well.

In operation, a well may be loaded with a sample and reagents, simultaneously or sequentially. When cells or cell beads are loaded, the well may be subjected to washing, e.g., to remove excess cells from the well, microwell array, or plate. Similarly, washing may be performed to remove excess beads or other reagents from the well, microwell array, or plate. In the instances where live cells are used, the cells may be lysed in the individual partitions to release the intracellular components or cellular analytes. Alternatively, the cells may be fixed or permeabilized in the individual partitions. The intracellular components or cellular analytes may couple to a support, e.g., on a surface of the microwell, on a solid support (e.g., bead), or they may be collected for further downstream processing. For instance, after cell lysis, the intracellular components or cellular analytes may be transferred to individual droplets or other partitions for barcoding. Alternatively, or in addition to, the intracellular components or cellular analytes (e.g., nucleic acid molecules) may couple to a bead comprising a nucleic acid barcode molecule; subsequently, the bead may be collected and further processed, e.g., subjected to nucleic acid reaction such as reverse transcription, amplification, or extension, and the nucleic acid molecules thereon may be further characterized, e.g., via sequencing. Alternatively, or in addition to, the intracellular components or cellular analytes may be barcoded in the well (e.g., using a bead comprising nucleic acid barcode molecules that are releasable or on a surface of the microwell comprising nucleic acid barcode molecules). The barcoded nucleic acid molecules or analytes may be further processed in the well, or the barcoded nucleic acid molecules or analytes may be collected from the individual partitions and subjected to further processing outside the partition. Further processing can include nucleic acid processing (e.g., performing an amplification, extension) or characterization (e.g., fluorescence monitoring of amplified molecules, sequencing). At any convenient or useful step, the well (or microwell array or plate) may be sealed (e.g., using an oil, membrane, wax, etc.), which enables storage of the assay or selective introduction of additional reagents.

Figure 6:
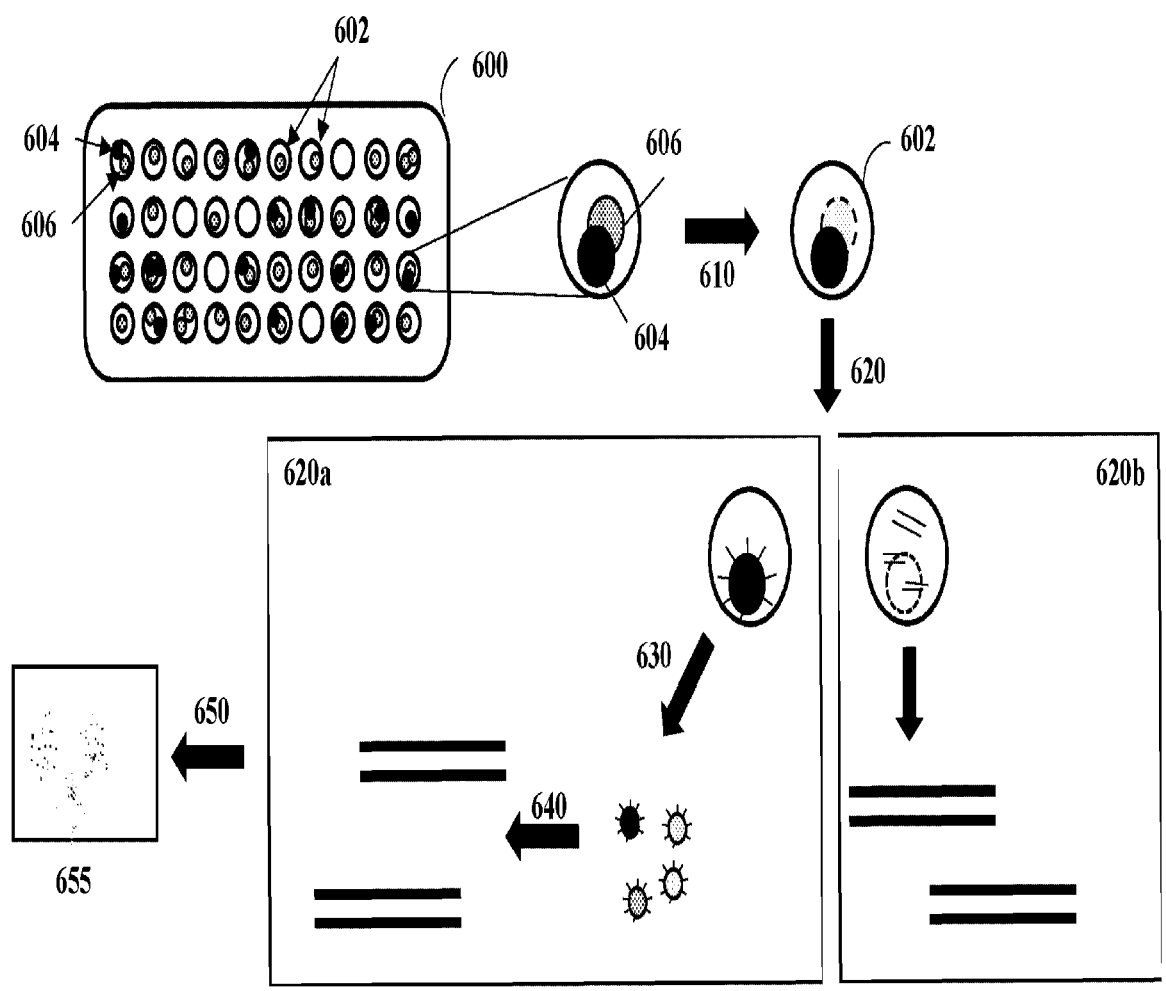
FIG. 6 shows an exemplary workflow for processing nucleic acid molecules.

Once sealed, the well may be subjected to conditions for further processing of a biological particle (e.g., a cell or a cell bead) in the well. For instance, reagents in the well may allow further processing of the biological particle, e.g., lysis of the cell, as further described herein. Alternatively, the well (or wells such as those of a well-based array) comprising the biological particle (e.g., cell or cell bead) may be subjected to freeze-thaw cycling to process the biological particle(s), e.g., lysis of a cell. The well containing the biological particle (e.g., cell or cell bead) may be subjected to freezing temperatures (e.g., 0° C., below 0° C., −5° C., −10° C., −15° C., −20° C., −25° C., −30° C., −35° C., −40° C., −45° C., −50° C., −55° C., −60° C., −65° C., −70° C., −80° C., or −85° C.). Freezing may be performed in a suitable manner, e.g., sub-zero freezer or a dry ice/ethanol bath. Following an initial freezing, the well (or wells) comprising the biological particle(s) (e.g., cell(s) or cell bead(s)) may be subjected to freeze thaw cycles to lyse biological particle(s). In one embodiment, the initially frozen well (or wells) are thawed to a temperature above freezing (e.g., room temperature or 25° C.). In another embodiment, the freezing is performed for less than 10 minutes (e.g., 5 minutes or 7 minutes) followed by thawing at room temperature for less than 10 minutes (e.g., 5 minutes or 7 minutes). This freeze-thaw cycle may be repeated a number of times, e.g., 2, 3, or 4 times, to obtain lysis of the biological particle(s) (e.g., cell(s) or cell bead(s)) in the well (or wells). In one embodiment, the freezing, thawing and/or freeze/thaw cycling is performed in the absence of a lysis buffer. Additional disclosure related to freeze-thaw cycling is provided in WO2019165181A1, which is incorporated herein by reference in its entirety FIG. 6 schematically shows an example workflow for processing nucleic acid molecules within a sample. A substrate 600 comprising a plurality of microwells 602 may be provided. A sample 606 which may comprise a cell, cell bead, cellular components or analytes (e.g., proteins and/or nucleic acid molecules) can be co-partitioned, in a plurality of microwells 602, with a plurality of beads 604 comprising nucleic acid barcode molecules. During process 610, the sample 606 may be processed within the partition. For instance, in the case of live cells, the cell may be subjected to conditions sufficient to lyse the cells and release the analytes contained therein. In process 620, the bead 604 may be further processed. By way of example, processes 620a and 620b schematically illustrate different workflows, depending on the properties of the bead 604.

In 620a, the bead comprises nucleic acid barcode molecules that are attached thereto, and sample nucleic acid molecules (e.g., RNA, DNA) may attach, e.g., via hybridization of ligation, to the nucleic acid barcode molecules. Such attachment may occur on the bead. In process 630, the beads 604 from multiple wells 602 may be collected and pooled. Further processing may be performed in process 640. For example, one or more nucleic acid reactions may be performed, such as reverse transcription, nucleic acid extension, amplification, ligation, transposition, etc. In some embodiments, one or more reactions occur on the bead using the sample nucleic acid molecules captured on the bead via the nucleic acid barcode molecules on the bead, e.g., sample nucleic acid molecules hybridized to complementary sequences of the nucleic acid barcode molecules on the bead. In some instances, adapter sequences are ligated to the nucleic acid molecules, or derivatives thereof, as described elsewhere herein. For instance, sequencing primer sequences may be appended to each end of the nucleic acid molecule. In process 650, further characterization, such as sequencing may be performed to generate sequencing reads. The sequencing reads may yield information on individual cells or populations of cells, which may be represented visually or graphically, e.g., in a plot 655.

In 620b, the bead comprises nucleic acid barcode molecules that are releasably attached thereto, as described below. The bead may degrade or otherwise release the nucleic acid barcode molecules into the well 602; the nucleic acid barcode molecules may then be used to barcode nucleic acid molecules within the well 602. Further processing may be performed either inside the partition or outside the partition. For example, one or more nucleic acid reactions may be performed, such as reverse transcription, nucleic acid extension, amplification, ligation, transposition, etc. In some instances, adapter sequences are ligated to the nucleic acid molecules, or derivatives thereof, as described elsewhere herein. For instance, sequencing primer sequences may be appended to each end of the nucleic acid molecule. In process 650, further characterization, such as sequencing may be performed to generate sequencing reads. The sequencing reads may yield information on individual cells or populations of cells, which may be represented visually or graphically, e.g., in a plot 655 In 620b, the bead comprises nucleic acid barcode molecules that are releasably attached thereto, as described below. The bead may degrade or otherwise release the nucleic acid barcode molecules into the well 602; the nucleic acid barcode molecules may then be used to barcode nucleic acid molecules within the well 602. Further processing may be performed either inside the partition or outside the partition. For example, one or more nucleic acid reactions may be performed, such as reverse transcription, nucleic acid extension, amplification, ligation, transposition, etc. In some instances, adapter sequences are ligated to the nucleic acid molecules, or derivatives thereof, as described elsewhere herein. For instance, sequencing primer sequences may be appended to each end of the nucleic acid molecule. In process 650, further characterization, such as sequencing may be performed to generate sequencing reads. The sequencing reads may yield information on individual cells or populations of cells, which may be represented visually or graphically, e.g., in a plot 655.

Once the lysis agents are co-partitioned in a droplet with a biological sample particle, these reagents can facilitate the release of the biomolecular contents of the biological sample particle within the droplet. As described elsewhere herein, the biomolecular contents released in a droplet remain discrete from the contents of other droplets, thereby allowing for detection and quantitation of the biomolecular analytes of interest present in that distinct biological sample.

Examples of lysis agents useful in the methods of the present disclosure include bioactive reagents, such as lysis enzymes that are used for lysis of different cell types, e.g., gram positive or negative bacteria, plants, yeast, mammalian, etc., such as lysozymes, achromopeptidase, lysostaphin, labiase, kitalase, lyticase, and a variety of other lysis enzymes available from, e.g., Sigma-Aldrich, Inc. (St Louis, MO), as well as other commercially available lysis enzymes. Other lysis agents may additionally or alternatively be co-partitioned with the biological particles to cause the release of the biological samples' contents into the droplet. For example, in some cases, surfactant-based lysis solutions may be used to lyse cells, although these may be less desirable for emulsion-based systems where the surfactants can interfere with stable emulsions. In some embodiment, the lysis solutions can include non-ionic surfactants such as, for example, Triton X-100 and Tween 20. In some cases, lysis solutions may include ionic surfactants such as, for example, sarcosyl and sodium dodecyl sulfate (SDS). Electroporation, thermal, acoustic or mechanical cellular disruption may also be used in certain cases, e.g., non-emulsion based partitioning such as encapsulation of biological particles that may be in addition to or in place of droplet partitioning, where any pore size of the encapsulate is sufficiently small to retain nucleic acid fragments of a given size, following cellular disruption.

In addition to the lysis agents co-partitioned into discrete droplets with the biological sample particles, it is further contemplated that other assay reagents can also be co-partitioned in the droplet. For example, DNase and RNase inactivating agents or inhibitors, such as proteinase K, chelating agents, such as EDTA, proteases, such as subtilisin A, and other reagents employed in removing or otherwise reducing negative activity or impact of different cell lysate components on subsequent processing of nucleic acids.

In some embodiments, the biological sample particles encapsulated in discrete droplets with other reagents are exposed to an appropriate stimulus to release the biomolecular contents of the sample particles and/or the contents of a co-partitioned bead microcapsule. For example, in some embodiments, a chemical stimulus may be co-partitioned in the droplet along with a biological sample particle and a gel bead microcapsule to allow for the degradation of the microcapsule and release of its contents into the droplet.

Additional assay reagents may also be co-partitioned into discrete droplets with the biological samples, such as endonucleases to fragment a biological sample's DNA, DNA polymerase enzymes and dNTPs used to amplify the biological sample's nucleic acid fragments and to attach the barcode molecular tags to the amplified fragments. Other enzymes may be co-partitioned, including without limitation, polymerase, transposase, ligase, proteinase K, DNase, subtilisin A, etc. Additional assay reagents may also include reverse transcriptase enzymes, including enzymes with terminal transferase activity, primers and oligonucleotides, and switch oligonucleotides (also referred to herein as "switch oligos" or "template switching oligonucleotides") which can be used for template switching.

In some embodiments, template switching can be used to increase the length of cDNA generated in an assay. In some embodiments, template switching can be used to append a predefined nucleic acid sequence to the cDNA. In an example of template switching, cDNA can be generated from reverse transcription of a template, e.g., cellular mRNA, where a reverse transcriptase with terminal transferase activity can add additional nucleotides, e.g., polyC, to the cDNA in a template independent manner.

Once the contents of a biological sample cell are released into a discrete droplet, the biomolecular components (e.g., macromolecular constituents of biological samples, such as RNA, DNA, or proteins) contained therein may be further processed within the droplet. In accordance with the methods and systems described herein, the biomolecular contents of individual biological samples can be provided with unique barcode identifiers, and upon characterization of the biomolecular components (e.g., in a sequencing assay) they may be attributed as having been derived from the same biological sample. The ability to attribute characteristics to individual biological samples or groups of biological samples is provided by the assignment of a nucleic acid barcode sequence specifically to an individual biological sample or groups of biological samples.

In some aspects, the unique identifier barcodes are provided in the form of nucleic acid molecules (e.g., oligonucleotides) that comprise sequences that may be attached to or otherwise associated with the nucleic acid contents of individual biological sample, or to other components of the biological sample, and particularly to fragments of those nucleic acids. In some embodiments, only one nucleic acid barcode sequence is associated with a given discrete droplet, although in some cases, two or more different barcode sequences may be present. The nucleic acid barcode sequences can include from about 6 to about 20 or more nucleotides within the sequence of the nucleic acid molecules (e.g., oligonucleotides). In some cases, the length of a barcode sequence may be about 6, 7, 8, 9, 10, 11, 12, 13, 14, 15, 16, 17, 18, 19, 20 nucleotides or longer. In some cases, the length of a barcode sequence may be at least about 6, 7, 8, 9, 10, 11, 12, 13, 14, 15, 16, 17, 18, 19, 20 nucleotides or longer. In some cases, the length of a barcode sequence may be at most about 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be about 4, 5, 6, 7, 8, 9, 10, 11, 12, 13, 14, 15, 16 nucleotides or longer. In some cases, the barcode subsequence may be at least about 4, 5, 6, 7, 8, 9, 10, 11, 12, 13, 14, 15, 16 nucleotides or longer. In some cases, the barcode subsequence may be at most about 4, 5, 6, 7, 8, 9, 10, 11, 12, 13, 14, 15, 16 nucleotides or shorter.

In some embodiments, the nucleic acid barcode molecules can also comprise other functional sequences useful in the processing of the nucleic acids from the biological sample in the droplet. These functional sequences can include, e.g., targeted or random/universal amplification primer sequences for amplifying the nucleic acid molecules from the individual biological samples within the partitions while attaching the associated barcode sequences, sequencing primers or primer recognition sites, hybridization or probing sequences, e.g., for identification of presence of the sequences or for pulling down barcoded nucleic acid molecules, or any of a number of other potential functional sequences.

Kits

Also provided herein is a kit. The kit may comprise a support which comprises a binding agent. The support and the binding agent may be according to the supports and binding agents provided elsewhere herein. The kit may further comprise instructions (e.g., printed instructions) for bringing an analyte in contact with a binding agent attached to the support to bind the analyte. The kit may comprise instructions for detecting analytes bound to the binding agent. The kit may further comprise additional reagents, consumables, biological particles, enzymes, buffers, tools, equipment, devices, such as microfluidic devices and/or other chemicals, instructions (e.g., printed instructions), and/or systems for performing the methods provided herein.

In some instances, binding agents provided in a kit herein may be immobilized on a surface of the support or may be configured to be attached to surface of the support. The attachment may be according to an attachment described elsewhere herein. In an example, the kit may comprise the binding agents and the supports and instructions (e.g., printed instructions) for immobilizing the binding agent on the surface of the support. The binding agent may be immobilized on a surface of the support by an affinity-tag, entrapment, linkage, cross-linkage, covalent bond, or any combination thereof. Alternatively, the kit may comprise the support with the binding agent attached thereto. The binding agents or supports may comprise a surface moiety or linker configured attach the binding agents to the support.

In some instances, the kit may comprise a support that includes beads and a binding agent for binding RNA. In some examples, the binding agent may include oligonucleotides encoding one or more poly(T) sequences. In some examples, the kit may contain reagents for labeling the analyte. In some examples, these reagents may be for labeling extracellular RNA in a sample. In some instances, the kit may comprise an analyte (e.g., RNA) to which to which the binding agent can bind, for use as a positive control.

In some examples, the kit may contain a device or component configured to remove the support and attached binding agent (e.g., RNA) from a sample.

In some instances, a kit herein may further comprise one or more microfluidic devices. The microfluidic device(s) may be used to separate the support from the sample. The microfluidic device(s) may be used to compartmentalize the sample into a plurality of partitions such as droplets or wells.

Compositions

In some examples, disclosed here are compositions of a binding agent attached to a support. In some examples, the composition may be a binding agent attached to a bead. In some examples, the composition may be an RNA-binding agent attached to a bead.

In some examples, disclosed here are compositions of a binding agent attached to a support that additionally include an analyte and a biological particle (e.g., a cell).

In some examples, disclosed here are compositions of a discrete droplet that encapsulates a biological particle from a sample subjected to or analyzed by the methods disclosed here.

EMBODIMENTS

Embodiments of the invention, which are not meant to be limiting, are described in the numbered paragraphs below.

1. A method, comprising:
   contacting an analyte with a binding agent attached to a support to bind the analyte to the binding agent; and
   detecting the bound analyte, binding agent that has bound the analyte and/or support attached a binding agent that has bound the analyte.
2. The method of paragraph 1, wherein the analyte is from a cell.
3. The method of one of paragraphs 1-2, wherein the analyte is released from a cell, including a nonviable cell.
4. The method of any one of paragraphs 1-3, wherein the analyte is an extracellular analyte.
5. The method of any one of paragraphs 1-4, wherein the analyte includes nucleic acids.
6. The method of any one of paragraphs 1-5, wherein the analyte includes deoxyribonucleic acid (DNA) and or ribonucleic acid (RNA).
7. The method of any one of paragraphs 1-6, wherein the analyte includes RNA.
8. The method of any one of paragraphs 1-7, wherein the analyte includes messenger RNA (mRNA).
9. The method of any one of paragraphs 1-8, wherein the analyte includes mRNA from a eukaryotic cell.
10. The method of any one of paragraphs 1-9, wherein the analyte includes RNA that is polyadenylated.
11. The method of any one of paragraphs 1-10, wherein the analyte includes a label that has been attached to the analyte prior to the contacting step.
12. The method of any one of paragraphs 1-11, wherein the analyte includes a label that has been attached to the analyte prior to the contacting step, wherein the label includes one or more of a colorimetric label, enzymatic label, fluorescent label, luminescent label or radioactive label.
13. The method of any one of paragraphs 1-12, wherein the analyte includes DNA and/or RNA that is labeled at its 3' and/or 5' ends.
14. The method of any one of paragraphs 1-13, wherein the analyte includes RNA and the RNA is labeled at its 3' and/or 5' ends by an enzyme selected from the group consisting of T4 RNA ligase, T4 polynucleotide kinase, DNA polymerase, RNA polymerase, and polymerase ribozyme.
15. The method of any one of paragraphs 1-14, wherein the analyte is in a sample.
16. The method of any one of paragraphs 1-15, wherein the analyte is in a sample, and wherein the sample is in liquid form.
17. The method of any one of paragraphs 1-16, wherein the analyte is in a sample, and wherein the sample includes biological particles.
18. The method of any one of paragraphs 1-17, wherein the analyte is in a sample, and wherein the sample includes biological particles that includes cells.
19. The method of any one of paragraphs 1-18, wherein the analyte is in a sample, wherein the sample includes biological particles that include viable cells.
20. The method of any one of paragraphs 1-19, wherein the analyte is in a sample, wherein the sample includes biological particles that include nonviable cells.
21. The method of any one of paragraphs 1-20, wherein the analyte is in a sample, wherein the sample includes biological particles that include viable cells and nonviable cells.

22. The method of any one of paragraphs 1-21, wherein the analyte is in a sample, wherein the sample includes biological particles that include cells, and wherein the analyte includes RNA that originated from the cells.

23. The method of any one of paragraphs 1-22, wherein the binding agent includes one or more of a protein, a peptide, an oligonucleotide, a polysaccharide or a lipid capable of binding an analyte.

24. The method of any one of paragraphs 1-23, wherein the binding agent includes an antibody or an aptamer.

25. The method of any one of paragraphs 1-24, wherein the binding agent includes an oligonucleotide that, optionally, includes a first nucleotide sequence that is complementary to a second nucleotide sequence present in the analyte.

26. The method of any one of paragraphs 1-25, wherein the binding agent includes an oligonucleotide that encodes a poly(T) nucleotide sequence.

27. The method of any one of paragraphs 1-26, wherein the binding agent is configured to bind an extracellular analyte.

28. The method of any one of paragraphs 1-27, wherein the binding agent is configured to bind a nucleic acid.

29. The method of any one of paragraphs 1-28, wherein the binding agent is configured to bind a nucleic acid, including DNA and/or RNA.

30. The method of any one of paragraphs 1-29, wherein the binding agent is configured to bind RNA 31. The method of any one of paragraphs 1-30, wherein the binding agent includes an RNA-binding protein.

32. The method of any one of paragraphs 1-31, wherein the binding agent includes a poly(A) binding protein (PABP).

33. The method of any one of paragraphs 1-32, wherein the binding agent includes an anti-RNA antibody.

34. The method of any one of paragraphs 1-33, wherein the binding agent is configured to bind a specific analyte.

35. The method of any one of paragraphs 1-34, wherein the binding agent is configured to bind a specific analyte and not to bind other analytes.

36. The method of any one of paragraphs 1-35, wherein the binding agent is configured to bind a specific analyte that includes RNA and not to bind other analytes.

37. The method of any one of paragraphs 1-36, wherein the binding agent includes a substrate that can be acted on by an enzymatic label added to the analyte.

38. The method of any one of paragraphs 1-37, wherein the binding agent includes an enzyme that has as a substrate, a label added or attached to the analyte.

39. The method of any one of paragraphs 1-38, wherein the binding agent is attached to the support by a physical and/or chemical method.

40. The method of any one of paragraphs 1-39, wherein the binding agent is attached to the support by a physical method, including hydrogen bonds, hydrophobic interactions, van der Waals forces, affinity binding or ionic binding.

41. The method of any one of paragraphs 1-40, wherein the binding agent is attached to the support by a chemical method, including covalent bonds.

42. The method of any one of paragraphs 1-41, wherein the binding agent is attached to the support by a chemical method, including ether, thio-ether, amide and/or carbamate covalent bonds.

43. The method of any one of paragraphs 1-42, wherein the binding agent is attached to the support by an affinity-tag, entrapment, linkage, cross-linkage, covalent bond, or combination thereof.

44. The method of any one of paragraphs 1-43, wherein the binding agent is attached to a surface of the support.

45. The method of any one of paragraphs 1-44, wherein the support includes a silica-based carrier, acrylic resin, synthetic polymer, active membrane and/or exchange resin.

46. The method of any one of paragraphs 1-45, wherein the support includes an organic or inorganic support.

47. The method of any one of paragraphs 1-46, wherein the support includes carboxymethyl-cellulose, starch, collagen, modified sepharose, an ion exchange resin, active charcoal, silica, clay, aluminum oxide, titanium, diatomaceous earth, hydroxyapatite, ceramic, celite, agarose, treated porous glass and/or a polymer.

48. The method of any one of paragraphs 1-47, wherein the support includes a nanoparticle, nanofiber, nanotube or nanocomposite.

49. The method of any one of paragraphs 1-48, wherein the support includes a bead, polymeric matrix, tube wall, pipette tip, column surface, micropillar, array, well, or combination thereof.

50. The method of any one of paragraphs 1-49, wherein the support includes a bead.

51. The method of any one of paragraphs 1-50, wherein the support includes a bead that is a solid bead or a gel bead.

52. The method of any one of paragraphs 1-51, wherein the support includes a bead that is magnetic.

53. The method of any one of paragraphs 1-52, wherein the support includes a gel bead comprising magnetic particles.

54. The method of any one of paragraphs 1-53, wherein the support includes a bead that is substantially spherical.

55. The method of any one of paragraphs 1-54, wherein the support includes a bead with a diameter of at least about 1 micrometer (µm) and/or between about 1-100, 1-20 or 5-10 µm in size.

56. The method of any one of paragraphs 1-55, wherein the bead is capable of scattering light.

57. The method of any one of paragraphs 1-56, wherein the bead is labeled by one or more dyes, enzymes or fluorophores.

58. The method of any one of paragraphs 1-57, wherein the support is configured to be impenetrable to a biological particle, including a cell and/or a viable cell.

59. The method of any one of paragraphs 1-58, wherein the support and the binding agent are configured such that the binding agent does not penetrate a biological particle, including a cell and/or a viable cell.

60. The method of any one of paragraphs 1-59, wherein the support is configured to not bind a biological particle, including a cell and/or a viable cell.

61. The method of any one of paragraphs 1-60, wherein the support is configured to be inert to metabolism and/or intracellular activities of cells.

62. The method of any one of paragraphs 1-61, wherein the support is configured to maintain, not decrease, or not substantially decrease viability of cells.

63. The method of any one of paragraphs 1-62, wherein the support includes a surface moiety or linker configured to bind the binding agent.

64. The method of any one of paragraphs 1-63, wherein contacting comprises placing the analyte and binding agent in proximity to one another such that the analyte can bind to the binding agent, or such that the binding agent can bind the analyte.
65. The method of any one of paragraphs 1-64, wherein contacting comprises placing the analyte in a location relative to the binding agent, and under conditions such that, the analyte can bind to the binding agent, or such that the binding agent can bind the analyte.
66. The method of any one of paragraphs 1-65, wherein contacting comprises physically touching the analyte to the binding agent, or physically touching the binding agent and/or support to the analyte.
67. The method of any one of paragraphs 1-66, wherein detecting the bound analyte includes: quantifying bound analyte; quantifying a binding agent that has bound analyte; or quantifying a support attached to a binding agent that has bound analyte.
68. The method of any one of paragraphs 1-67, wherein the analyte includes a label, and detecting includes detecting a support having an attached binding agent that has bound the labeled analyte.
69. The method of any one of paragraphs 1-68, wherein detecting includes analyzing the bound analyte, binding agent and/or support using a stationary system or a flowable system.
70. The method of any one of paragraphs 1-69, wherein detecting includes analyzing the bound analyte, binding agent and/or support using a stationary system that includes a microtiter well or a tube.
71. The method of any one of paragraphs 1-70, wherein detecting includes analyzing the bound analyte, binding agent and/or support using a flowable system that includes an analytical flow cytometry instrument.
72. The method of any one of paragraphs 1-71, additionally comprising a step of labeling the analyte.
73. The method of paragraph 72, wherein the step of labeling the analyte is performed prior to the contacting step.
74. The method of one of paragraphs 72 or 73, wherein the analyte includes nucleic acids, and the labeling includes enzymatic and/or chemical labeling of the nucleic acids.
75. The method of any one of paragraphs 72-74, wherein the analyte includes RNA and the labeling includes enzymatic labeling of the RNA at its 5' and/or 3' ends.
76. The method of any one of paragraphs 72-75, wherein the analyte includes RNA and labeling includes incorporating a modified nucleotide and/or ribonucleotide at 5' and/or 3' ends of the RNA.
77. The method of any one of paragraphs 72-76, wherein the analyte includes RNA and labeling includes incorporating a modified phosphate at the 5' end of the RNA.
78. The method of one of paragraphs 76 or 77, wherein the modified nucleotide and/or modified phosphate includes a colorimetric, enzymatic, fluorescent, luminescent and/or radioactive label.
79. The method of any one of paragraphs 72-74, wherein the analyte includes RNA and the labeling includes chemical labeling of the RNA.
80. The method of paragraph 79, wherein the analyte includes RNA and the labeling includes an amine, hydrazide, psoralen, phenyl azide and/or a temperature-activated platinum-based moiety (ULS labeling reagents).
81. The method of any one of paragraphs 1-80, wherein the analyte is in a sample that also comprises biological particles, and additionally comprising a step of adding a vital dye to the sample.
82. The method of any one of paragraphs 1-81, wherein the analyte is in a sample that also comprises cells, and additionally comprising a step of adding a vital dye to the sample.
83. The method of one of paragraphs 81 or 82, wherein the vital dye includes a fluorescent dye.
84. The method of one of paragraphs 81 or 82, wherein the vital dye includes propidium iodide (PI) or 7-amino-actinomycin D (7-AAD).
85. The method of paragraph 1, wherein the analyte is in a sample that also comprises biological particles, including cells, and additionally comprising a step of adding to the sample an antibody that binds viable cells and not nonviable cells, or binds nonviable cells and not viable cells.
86. The method of any one of paragraphs 1-85, wherein the analyte is in a sample that also comprises biological particles, including cells, and additionally comprising a step of adding an anti-annexin V antibody to the sample.
87. The method of any one of paragraphs 1-86, wherein the analyte is in a sample that also comprises biological particles, and additionally comprising a step of detecting viable biological particles or detecting nonviable biological particles in the sample.
88. The method of any one of paragraphs 1-87, wherein the analyte is in a sample that also comprises cells, and additionally comprising a step of detecting viable cells or detecting nonviable cells in the sample.
89. The method of one of paragraphs 87 or 88, wherein nonviable biological particles or cells are detected by determining staining with a vital dye.
90. The method of one of paragraphs 87 or 88, wherein nonviable biological particles or cells are detected by determining staining with an anti-annexin V antibody.
91. The method of any one of paragraphs 1-90, wherein the analyte is in a sample that also comprises biological particles, and additionally comprising a step of removing the bound analyte from the sample, leaving the biological particles.
92. The method of any one of paragraphs 1-91, wherein the analyte is in a sample that also comprises cells, and additionally comprising a step of removing the bound analyte from the sample, leaving the cells.
93. The method of one of paragraphs 91 or 92, wherein the bound analyte is removed from the sample by removing from the sample the binding agent and/or the support to which the binding agent is attached.
94. The method of any one of paragraphs 91-93, wherein the bound analyte, the binding agent and/or the support to which the binding agent is attached are removed from the sample using an electromagnetic, electromotive, magnetic and/or mechanical force.
95. The method of any one of paragraphs 1-94, wherein the analyte is in a sample that also comprises biological particles, and additionally comprising a step of determining whether to further process the biological particles based on the detecting step.
96. The method of any one of paragraphs 1-95, wherein the analyte is in a sample that also comprises cells, and additionally comprising a step of determining whether to further process the cells based on the detecting step.

97. The method of one of paragraphs 95 or 96, wherein further processing includes partitioning the biological particles or cells into a discrete droplet.
98. The method of one of paragraphs 95-97, wherein further processing includes generating a discrete droplet that encapsulates the biological particles or cells.
99. The method of any one of paragraphs 95-98, wherein further processing includes generating a discrete droplet that encapsulates the biological particles or cells using a microfluidic device.
100. A binding agent attached to a support, as described in any of the methods of paragraphs 1-99.
101. A composition, comprising a binding agent attached to a support as described in any of the methods of paragraphs 1-99; an analyte as described in any of the methods of paragraphs 1-99; and a biological particle.
102. A composition, comprising a discrete droplet that encapsulates a cell from a cell suspension subjected to the method described in any of paragraphs 1-99.
103. A method for quantifying nucleic acids in a cell suspension, comprising:
adding nucleic acid-capturing supports to a cell suspension comprising extracellular nucleic acids; and
determining the number of supports that have captured nucleic acids and/or determining the amount of nucleic acids captured by the supports.
103a. The method of paragraph 103, additionally including a binding agent attached to the support that is capable of binding the nucleic acids.
104. The method of one of paragraphs 103 and 103a, based on the quantifying, creating a gene expression library from the cell in the suspension or a similar suspension.
105. A method for quantifying extracellular RNA in a cell suspension, comprising:
labeling the extracellular RNA in the cell suspension;
contacting the labeled extracellular RNA with beads functionalized to bind RNA; and
quantifying an amount of RNA bound by the beads.
106. The method of paragraph 105, comprising an additional step of contacting cells in the cell suspension with a vital dye.
107. The method of one of paragraphs 105 or 106, comprising an additional step of detecting a number and/or percentage of cells in the suspension stained with a/the vital dye.
108. The method of any one of paragraphs 105-107, comprising an additional step of contacting the cells in the suspension with an antibody.
109. The method of paragraph 108, comprising an additional step of detecting a number and/or percentage of cells in the suspension bound by the antibody.
110. The method of one of paragraphs 108 or 109, where binding of a cell by the antibody is indicative of viability of the cell.
111. The method of any one of paragraphs 105-110, comprising an additional step of correlating the amount of RNA bound by the beads with a number and/or percentage of viable cells in the suspension.
112. The method of any one of paragraphs 105-111, comprising an additional step of partitioning the cells in the suspension into discrete droplets.
113. The method of any one of paragraphs 105-112, comprising an additional step of constructing gene expression libraries from individual of the cells in the cell suspension.
114. A method for removing nucleic acids in solution from a cell suspension, comprising:
contacting the nucleic acids in the cell suspension with a nucleic acid binding agent attached to a bead to bind the nucleic acids to the binding agent; and
removing the bead, binding agent and bound nucleic acid from the cell suspension, leaving the cells in the suspension.
115. The method of paragraph 114, where the nucleic acids include ribonucleic acid (RNA).
116. The method of one of paragraphs 114 or 115, where the nucleic acid-binding agent includes RNA-capturing components, including oligonucleotides encoding poly (T) nucleotide sequences, an anti-RNA antibody, or a poly(A) binding protein (PABP).
117. A kit, comprising:
a support comprising an attached binding agent, and
printed instructions describing the method of any one of paragraphs 1-99 or 103-116.
119. A kit, comprising:
a support comprising an attached binding agent, and
an analyte to which the binding agent can bind.
120. A kit comprising:
beads having an attached RNA-binding agent; and
printed instructions describing the method of any one of paragraphs 1-99 or 103-116.
121. The kit of paragraph 120, additionally comprising reagents for use in labeling RNA.
122. The kit of one of paragraphs 120 or 121, additionally comprising labeled or unlabeled RNA, to which the RNA-binding agent can bind, for use as a positive control.
123. The kit of any one of paragraphs 120-122, additionally comprising a device or component configured to remove the support and attached binding agent or attached RNA-binding agent from a sample.
124. A sample comprising cells, wherein the sample has been subjected to the method of any one of paragraphs 1-99 or 103-116.
125. A method of sample analysis comprising:
a) providing a biological sample comprising a plurality of cells and extracellular analytes;
b) contacting the biological sample with a support, wherein the support comprises a binding agent configured to couple to said extracellular analytes, wherein said binding agent comprises a label, and wherein said contacting comprises conditions to allow formation of binding agents comprising bound extracellular analytes;
c) detecting said bound extracellular analytes via said label, wherein said detecting provides information about quality of said biological sample; and
d) partitioning said plurality of cells in a plurality of partitions for said sample analysis.
126. A method of sample analysis comprising
a) providing a biological sample comprising a plurality of cells and extracellular analytes;
b) contacting the biological sample with a support, wherein the support comprises a binding agent configured to couple to said extracellular analytes and wherein said contacting comprises conditions to allow formation of binding agents comprising bound extracellular analytes;
c) removing said binding agents comprising bound extracellular analytes, thereby removing said bound extracellular analytes from said biological sample; and d) partitioning said plurality of cells in a plurality of partitions for said sample analysis.

127. The method of one of paragraphs 125 or 126, wherein the extracellular analytes originate from or were released by the plurality of cells.

128. The method of one of paragraphs 125 or 126, wherein the support is a plurality of supports.

129. The method of one of paragraphs 125 or 126, wherein said extracellular analytes comprise one or more of nucleic acids, peptides, and proteins.

130. The method of paragraph 126, wherein said binding agent comprises a label.

131. The method of paragraph 130, further comprising detecting said bound extracellular analytes via said label, wherein said detecting provides information about quality of said biological sample.

132. The method of one of paragraphs 125 or 126, wherein said partitioning further comprises partitioning said plurality of cells with a plurality of nucleic acid barcode molecules.

133. The method of paragraph 132, wherein said plurality of nucleic acid barcode molecules are provided as part of a support.

134. The method of paragraph 133, wherein said support is a bead.

135. The method of paragraph 134, wherein said bead is a gel bead.

136. The method of one of paragraphs 125 or 126, wherein said plurality of partitions is a plurality of droplets or a plurality of wells.

The invention claimed is:

1. A method for analyzing a sample, comprising:
(a) providing (i) a sample comprising a plurality of cells and extracellular ribonucleic acid (RNA) molecules and (ii) a plurality of binding agents each of which comprises a label of a plurality of labels, wherein the plurality of binding agents is configured to couple to the extracellular RNA molecules;
(b) contacting the extracellular RNA molecules with the plurality of binding agents to generate a plurality of coupled extracellular RNA molecules;
(c) detecting the plurality of coupled extracellular RNA molecules via the plurality of labels to determine an amount of the extracellular RNA molecules in the sample;
(d) using the amount of the extracellular RNA molecules in the sample to determine if the plurality of cells in the sample is of sufficient quality for processing in a cell assay,
wherein the cell assay is a nucleic acid analysis assay; and
(e)
(A) if the plurality of cells in the sample is determined, in (d), to be of sufficient quality for processing in the cell assay in (d), performing the cell assay with cells of the plurality of cells; or
(B) if the plurality of cells in the sample is determined, in (d), to not be of sufficient quality for processing in the cell assay, withholding cells of the plurality of cells from the cell assay.

2. The method of claim 1, wherein the plurality of binding agents is coupled to a support.

3. The method of claim 2, wherein the support is a bead.

4. The method of claim 1, wherein the label of the plurality of labels is configured to generate a signal upon coupling of an extracellular RNA molecule of the extracellular RNA molecules to a binding agent of the plurality of binding agents, and wherein (c) comprises detecting the signal.

5. The method of claim 4, wherein the signal is a fluorescence signal.

6. The method of claim 1, wherein (d) comprises comparing the amount of the extracellular RNA molecules to a threshold value to determine if the plurality of cells in the sample is of sufficient quality for processing in the cell assay.

7. The method of claim 1, further comprising: (1) determining that the plurality of cells in the sample is not of sufficient quality for processing in the cell assay; and (2) withholding cells of the plurality of cells from the cell assay.

8. The method of claim 1, further comprising: (1) determining that the plurality of cells in the sample is of sufficient quality for processing in the cell assay; and (2) performing the cell assay with cells of the plurality of cells.

9. The method of claim 7, further comprising reducing the amount of the extracellular RNA molecules in the sample prior to using the plurality of cells in the sample in the cell assay.

10. The method of claim 9, wherein the plurality of binding agents is coupled to a support, and wherein the method further comprises using the support to remove the plurality of coupled extracellular RNA molecules from the sample.

11. The method of claim 10, wherein the support is a bead, and wherein the bead is a solid bead, gel bead, or magnetic bead.

12. The method of claim 1, wherein the extracellular RNA molecules originate from the plurality of cells.

13. The method of claim 1, wherein (c) comprises using flow cytometry to detect the plurality of labels.

14. The method of claim 1, wherein the sample is partitioned into a well, and wherein, in (c), the plurality of labels is detected in the well.

15. The method of claim 1, wherein the label of the plurality of labels is not detectable in absence of an extracellular RNA molecule of the extracellular RNA molecules coupled to a binding agent of the plurality of binding agents.

16. The method of claim 1, further comprising generating a nucleotide sequencing library from the plurality of cells in the sample.

17. The method of claim 16, further comprising using the nucleotide sequencing library to generate a knee plot.

18. The method of claim 17, wherein (d) comprises comparing the amount of the extracellular RNA molecules to the knee plot.

19. The method of claim 1, wherein the plurality of binding agents comprises one or more members selected from the group consisting of a peptide and a polypeptide.

20. The method of claim 1, wherein the plurality of binding agents comprises a nucleic acid molecule.

21. The method of claim 20, wherein the nucleic acid molecule comprises a polythymine sequence.

22. The method of claim 1, wherein the plurality of binding agents is configured to couple to a specific extracellular RNA molecule of the extracellular RNA molecules.

23. The method of claim 1, further comprising detecting the plurality of labels while the plurality of labels is coupled to the extracellular RNA molecules via the plurality of binding agents.

* * * * *